(12) United States Patent
Millward et al.

(10) Patent No.: US 12,428,226 B2
(45) Date of Patent: Sep. 30, 2025

(54) TRACK ASSEMBLY FOR A STORAGE SYSTEM

(71) Applicant: Ocado Innovation Limited, Hatfield (GB)

(72) Inventors: Stephen Millward, Hatfield (GB); Jaroslaw Malinowski, Hatfield (GB); Pawel Karolinczak, Hatfield (GB); Martyn Bates, Hatfield (GB); Andrew Ingram-Tedd, Hatfield (GB)

(73) Assignee: OCADO INNOVATION LIMITED, Hatfield (GB)

( * ) Notice: Subject to any disclaimer, the term of this patent is extended or adjusted under 35 U.S.C. 154(b) by 230 days.

(21) Appl. No.: 18/041,530

(22) PCT Filed: Aug. 12, 2021

(86) PCT No.: PCT/EP2021/072539
§ 371 (c)(1),
(2) Date: Feb. 13, 2023

(87) PCT Pub. No.: WO2022/034191
PCT Pub. Date: Feb. 17, 2022

(65) Prior Publication Data
US 2023/0303323 A1 Sep. 28, 2023

(30) Foreign Application Priority Data

Aug. 14, 2020 (GB) .................................. 2012740
Aug. 14, 2020 (GB) .................................. 2012751
(Continued)

(51) Int. Cl.
*B65G 1/04* (2006.01)
*B65G 1/06* (2006.01)
*E04B 1/24* (2006.01)

(52) U.S. Cl.
CPC ......... *B65G 1/0457* (2013.01); *B65G 1/0464* (2013.01); *B65G 1/0478* (2013.01);
(Continued)

(58) Field of Classification Search
CPC ... F16M 7/00; F16M 1/00; B65G 1/02; B65G 1/065; B65G 1/0464; B65G 1/0457;
(Continued)

(56) References Cited

U.S. PATENT DOCUMENTS 3,022,980 A 2/1962 Barker
10,660,438 B2 5/2020 Hognaland et al.
(Continued)

FOREIGN PATENT DOCUMENTS

CA 3080839 A1 5/2019
CN 103612882 A 3/2014
(Continued)

OTHER PUBLICATIONS

Office Action issued on Jun. 3, 2024, by the Canadian Patent Office in corresponding Canadian Patent Application No. 3,191, 155. (8 pages).
(Continued)

*Primary Examiner* — Glenn F Myers
(74) *Attorney, Agent, or Firm* — Buchanan Ingersoll & Rooney PC

(57) ABSTRACT

A system for guiding the movement of one or more load handling devices in operation includes: a) a first set of parallel tracks and a second set of parallel tracks, the first and second sets of parallel tracks sharing a common track, each track of the first and second set of parallel tracks providing a track surface; and b) a first load handling device and a second load handling device, each having a wheel assembly engaging with the track surface and with the track surface of the common track; wherein each track of the first
(Continued)

and second sets of parallel tracks include only two guide surfaces extending from the track surface for guiding the first and second load handing devices along their respective first and second sets of parallel tracks.

11 Claims, 21 Drawing Sheets

(30) Foreign Application Priority Data

| Sep. 4, 2020 | (GB) | ..................................... 2013968 |
| Oct. 9, 2020 | (GB) | ..................................... 2016081 |
| Oct. 9, 2020 | (GB) | ..................................... 2016097 |

(52) U.S. Cl.
CPC ............ B65G 1/065 (2013.01); E04B 1/2403 (2013.01); *E04B 2001/2406* (2013.01); *E04B 2001/2418* (2013.01)

(58) Field of Classification Search
CPC ................. B65G 1/0478; E04B 1/2403; E04B 2001/2421; E04B 2001/2448; E04B 2001/2439; E04B 2001/2463; E04B 2001/2406; E04B 2001/2418; E04B 2001/2415; B66C 7/08; B61B 1/00; B61B 5/02
See application file for complete search history.

(56) References Cited

U.S. PATENT DOCUMENTS

| 2004/0182025 | A1 | 9/2004 | Moutsokapas et al. |
| 2006/0003667 | A1 | 1/2006 | Aisenbrey |
| 2008/0075566 | A1 | 3/2008 | Benedict et al. |
| 2008/0213073 | A1 | 9/2008 | Benedict et al. |
| 2013/0343844 | A1 | 12/2013 | Fosnight et al. |
| 2016/0145058 | A1 | 5/2016 | Lindbo |
| 2017/0305668 | A1 | 10/2017 | Bestic et al. |
| 2017/0355524 | A1* | 12/2017 | Hognaland ............. B66F 9/063 |
| 2018/0035625 | A1 | 2/2018 | Lindbo et al. |
| 2018/0037411 | A1 | 2/2018 | Lindbo et al. |
| 2018/0044110 | A1 | 2/2018 | Clarke et al. |
| 2018/0044111 | A1 | 2/2018 | Clarke et al. |
| 2018/0050869 | A1 | 2/2018 | Lindbo et al. |
| 2018/0051459 | A1 | 2/2018 | Clarke et al. |
| 2018/0086559 | A1 | 3/2018 | Lindbo et al. |
| 2018/0086573 | A1 | 3/2018 | Lindbo |
| 2018/0093828 | A1 | 4/2018 | Lindbo et al. |
| 2018/0148259 | A1* | 5/2018 | Gravelle ................... B65G 1/04 |
| 2018/0160150 | A1 | 6/2018 | Wu et al. |
| 2018/0194571 | A1* | 7/2018 | Fryer ...................... B65G 45/10 |
| 2018/0237221 | A1 | 8/2018 | Lindbo et al. |
| 2019/0019707 | A1* | 1/2019 | Suzuki ...................... B25J 9/104 |
| 2019/0161273 | A1 | 5/2019 | Ingram-Tedd et al. |
| 2019/0233213 | A1 | 8/2019 | Phan-Quiroga et al. |
| 2019/0239640 | A1 | 8/2019 | Lert et al. |
| 2019/0241362 | A1 | 8/2019 | Lindbo et al. |
| 2020/0042563 | A1 | 2/2020 | Hognaland |
| 2020/0130934 | A1 | 4/2020 | Clarke et al. |
| 2020/0140196 | A1 | 5/2020 | Clarke et al. |
| 2020/0148471 | A1 | 5/2020 | Lindbo et al. |
| 2020/0208395 | A1 | 7/2020 | Hall et al. |
| 2020/0231381 | A1 | 7/2020 | Lindbo et al. |
| 2020/0318338 | A1 | 10/2020 | Austrheim |
| 2020/0343118 | A1 | 10/2020 | Torazawa et al. |
| 2020/0361707 | A1 | 11/2020 | Lindbo et al. |
| 2020/0391942 | A1 | 12/2020 | Lindbo et al. |
| 2021/0169219 | A1 | 6/2021 | Lert et al. |
| 2021/0179355 | A1 | 6/2021 | Heggebø et al. |
| 2021/0309459 | A1 | 10/2021 | Clarke et al. |
| 2023/0303325 | A1 | 9/2023 | Kirby et al. |
| 2023/0303326 | A1 | 9/2023 | Cogley et al. |
| 2023/0303327 | A1 | 9/2023 | Malinowski et al. |
| 2024/0010425 | A1 | 1/2024 | Noar et al. |

FOREIGN PATENT DOCUMENTS

| CN | 111139939 | A | 5/2020 |
| CN | 211365948 | U | 8/2020 |
| CN | 109230155 | B | 2/2021 |
| DE | 202013007058 | U1 | 11/2014 |
| EP | 0081960 | A1 | 6/1983 |
| EP | 1116683 | A1 | 7/2001 |
| EP | 3017932 | A1 | 5/2016 |
| GB | 2012740 | A | 8/1979 |
| GB | 2013968 | A | 8/1979 |
| GB | 2016081 | A | 9/1979 |
| GB | 2016097 | A | 9/1979 |
| GB | 2554109 | A | 3/2018 |
| GB | 2594559 | A | 11/2021 |
| GB | 2594560 | A | 11/2021 |
| JP | 3025818 | B2 | 6/1996 |
| JP | 2000233812 | A | 8/2000 |
| JP | 2003253797 | A | 9/2003 |
| JP | 2004091095 | A | 3/2004 |
| JP | 2019507714 | A | 3/2019 |
| JP | 2020519551 | A | 7/2020 |
| JP | 2023512658 | A | 3/2023 |
| NO | 343387 | B1 | 2/2019 |
| NO | 20200118 | A1 | 8/2021 |
| WO | 2014195901 | A1 | 12/2014 |
| WO | 2015019055 | A1 | 2/2015 |
| WO | 2015185628 | A2 | 12/2015 |
| WO | 2016029205 | A1 | 2/2016 |
| WO | 2016063197 | A1 | 4/2016 |
| WO | 2016166294 | A1 | 10/2016 |
| WO | 2016172793 | A1 | 11/2016 |
| WO | 2016193767 | A1 | 12/2016 |
| WO | 2017081281 | A1 | 5/2017 |
| WO | 2017122150 | A1 | 7/2017 |
| WO | 2017153583 | A1 | 9/2017 |
| WO | 2017220651 | A1 | 12/2017 |
| WO | 2018049441 | A1 | 3/2018 |
| WO | 2018146304 | A1 | 8/2018 |
| WO | 2018210952 | A1 | 11/2018 |
| WO | 2019032651 | A1 | 2/2019 |
| WO | 2019087618 | A1 | 5/2019 |
| WO | 2019094511 | A1 | 5/2019 |
| WO | 2019101367 | A1 | 5/2019 |
| WO | 2019101725 | A1 | 5/2019 |
| WO | 2019157197 | A1 | 8/2019 |
| WO | 2019238702 | A1 | 12/2019 |
| WO | 2020074257 | A1 | 4/2020 |
| WO | 2020092149 | A1 | 5/2020 |
| WO | 2020094339 | A1 | 5/2020 |
| WO | 2020224828 | A1 | 11/2020 |
| WO | 2021152170 | A1 | 8/2021 |
| WO | 2021175873 | A1 | 9/2021 |
| WO | 2022048973 | A1 | 3/2022 |

OTHER PUBLICATIONS

Office Action issued on Jun. 3, 2024, by the Canadian Patent Office in corresponding Canadian Patent Application No. 3,191,324. (4 pages).

Office Action issued on Jun. 4, 2024, by the Canadian Patent Office in corresponding Canadian Patent Application No. 3,190,958. (4 pages).

The extended European Search Report issued on Jun. 14, 2024, by the European Patent Office in corresponding European Application No. 24164309.7. (11 pages).

International Search Report (PCT/ISA/210) and Written Opinion (PCT/ISA/237) mailed on Nov. 11, 2021, by the European Patent Office as the International Searching Authority for International Application No. PCT/EP2021/072532. (20 pages).

International Search Report (PCT/ISA/210) and Written Opinion (PCT/ISA/237) mailed on Nov. 12, 2021, by the European Patent

(56) References Cited

OTHER PUBLICATIONS

Office as the International Searching Authority for International Application No. PCT/EP2021/072547. (20 pages).
International Search Report (PCT/ISA/210) and Written Opinion (PCT/ISA/237) mailed on Nov. 5, 2021, by the European Patent Office as the International Searching Authority for International Application No. PCT/EP2021/072538. (12 pages).
International Search Report (PCT/ISA/210) and Written Opinion (PCT/ISA/237) mailed on Nov. 8, 2021, by the European Patent Office as the International Searching Authority for International Application No. PCT/EP2021/072536. (13 pages).
Patents Act 1977: Combined Search and Examination Report under Sections 17 and 18(3) dated Feb. 4, 2022, issued by the United Kingdom Intellectual Property Office in Application No. GB2111578.7. (3 pages).
Patents Act 1977: Combined Search and Examination Report under Sections 17 and 18(3) dated Feb. 4, 2022, issued by the United Kingdom Intellectual Property Office in Application No. GB2111587.8. (2 pages).
Patents Act 1977: Combined Search and Examination Report under Sections 17 dated Feb. 8, 2022, issued by the United Kingdom Intellectual Property Office in Application No. GB2111607.4. (9 pages).
Patents Act 1977: Examination Report under Sections 18(3) dated Nov. 9, 2022, issued by the United Kingdom Intellectual Property Office in Application No. GB2111607.4. (5 pages).
Patents Act 1977: Search Report under Sections 17 dated Dec. 14, 2021, issued by the United Kingdom Intellectual Property Office in Application No. GB2109567.4. (1 page).
Patents Action 1977: Combined Search and Examination Report under Section 17 & 18(3) dated Feb. 4, 2022, issued by the United Kingdom Intellectual Property Office in Application No. GB2111597.7. (4 pages).
Patents Action 1977: Combined Search and Examination Report under Section 17 and 18(3) dated Feb. 8, 2023, issued by the United Kingdom Intellectual Property Office in Application No. GB2218269.5. (5 pages).
Patents Action 1977: Combined Search and Examination Report under Sections 17 & 18(3) dated Feb. 4, 2022, issued by the United Kingdom Intellectual Property Office in Application No. GB2111582.9. (5 pages).
Patents Action 1977: Search Report under Section 17 dated Feb. 1, 2022, issued by the United Kingdom Intellectual Property Office in Application No. GB2111587.8. (1 page).
Patents Action 1977: Search Report under Section 17 dated Feb. 3, 2022, issued by the United Kingdom Intellectual Property Office in Application No. GB2111578.7. (2 pages).
Patents Action 1977: Search Report under Section 17(5) dated Feb. 15, 2021, issued by the United Kingdom Intellectual Property Office in Application No. GB2012751.0. (4 pages).
Patents Action 1977: Search Report under Section 17(5) dated Feb. 7, 2021, issued by the United Kingdom Intellectual Property Office in Application No. GB2012740.3. (3 pages).
Patents Action 1977: Search Report under Section 17(5) dated Jun. 16, 2021, issued by the United Kingdom Intellectual Property Office in Application No. GB2016081.8. (3 pages).
Patents Action 1977: Search Report under Section 17(5) dated May 20, 2021, issued by the United Kingdom Intellectual Property Office in Application No. GB2016097.4. (4 pages).
International Search Report (PCT/ISA/210) and Written Opinion (PCT/ISA/237) mailed on Nov. 30, 2021, by the European Patent Office as the International Searching Authority for International Application No. PCT/EP2021/072539. (14 pages).
Office Action (Examination Report No. 1) issued on Jun. 7, 2024, by the Australian Patent Office in corresponding Australian Patent Application No. 2021399015. (4 pages).
Office Action issued on Jun. 27, 2024, by the Canadian Patent Office in corresponding Canadian Patent Application No. 3,190,648. (6 pages).
Office Action issued on Jun. 28, 2024, by the Canadian Patent Office in corresponding Canadian Patent Application No. 3,190,629. (5 pages).
First Office Action issued on Feb. 13, 2024, by the Japanese Patent Office in corresponding Japanese Patent Application No. 2023-510417, and an English Translation of the Office Action. (6 pages).
First Office Action issued on Mar. 19, 2024, by the Japanese Patent Office in corresponding Japanese Patent Application No. 2023-510421, and an English Translation of the Office Action. (10 pages).
Office Action (Examination Report No. 1) issued on Apr. 17, 2024, by the Australian Patent Office in corresponding Australian Patent Application No. 2021325368. (4 pages).
Office Action (Examination Report No. 1) issued on Apr. 4, 2024, by the Australian Patent Office in corresponding Australian Patent Application No. 2021324116. (4 pages).
Office Action (Examination Report No. 1) issued on Jan. 30, 2024, by the Australian Patent Office in corresponding Australian Patent Application No. 2021325729. (4 pages).
Office Action (Examination Report No. 1) issued on Mar. 22, 2024, by the Australian Patent Office in corresponding Australian Patent Application No. 2021324385. (4 pages).
Office Action (Examination Report No. 1) issued on Jan. 15, 2024, by the Australian Patent Office in corresponding Australian Patent Application No. 2021325730. (4 pages).
First Office Action issued on Apr. 16, 2024, by the Japanese Patent Office in corresponding Japanese Patent Application No. 2023-510416, and an English Translation of the Office Action. (8 pages).
First Office Action issued on Feb. 13, 2024, by the Japanese Patent Office in corresponding Japanese Patent Application No. 2023-510419, and an English Translation of the Office Action. (6 pages).
Office Action issued on Feb. 5, 2025 by the European Patent Office in European Application No. 21758713.8 (5 pages) corresponding to Applicant's U.S. Appl. No. 18/041,530.
Office Action issued on Mar. 17, 2025 by the Korean Patent Office in Korean Application No. 10-2023-7008876 (9 pages) corresponding to Applicant's U.S. Appl. No. 18/041,530.

* cited by examiner

TRACK ASSEMBLY FOR A STORAGE SYSTEM

TECHNICAL FIELD

The present invention relates to the field of a storage or fulfilment system in which stacks of bins or containers are arranged within a grid framework structure, more specifically to a track or track assembly configured to guide one or more load handling devices operative to move one or more containers stored in the storage or fulfilment system.

BACKGROUND

Storage systems comprising a three-dimensional storage grid structure, within which storage containers/bins are stacked on top of each other, are well known. PCT Publication No. WO2015/185628A (Ocado) describes a known storage and fulfilment system 1 in which stacks of bins or containers are arranged within a grid framework structure. The bins or containers are accessed by load handling devices operative on tracks located on the top of the grid framework structure. A system of this type is illustrated schematically in FIGS. 1 to 3 of the accompanying drawings.

As shown in FIGS. 1 and 2, stackable containers, known as bins 10, are stacked on top of one another to form stacks 12. The stacks 12 are arranged in a grid framework structure 14 in a warehousing or manufacturing environment. The grid framework structure is made up of a plurality of storage columns or grid columns. Each grid in the grid framework structure has at least one grid column for storage of a stack of containers. FIG. 1 is a schematic perspective view of the grid framework structure 14, and FIG. 2 is a top-down view showing a stack 12 of bins 10 arranged within the framework structure 14. Each bin 10 typically holds a plurality of product items (not shown), and the product items within a bin 10 may be identical, or may be of different product types depending on the application.

The grid framework structure 14 comprises a plurality of upright members 16 that support horizontal members 18, 20. A first set of parallel horizontal grid members 18 is arranged perpendicularly to a second set of parallel horizontal members 20 in a grid pattern to form a plurality of horizontal grid structures 15 supported by the upright members 16. The members 16, 18, 20 are typically manufactured from metal. The bins 10 are stacked between the members 16, 18, 20 of the grid framework structure 14, so that the grid framework structure 14 guards against horizontal movement of the stacks 12 of bins 10, and guides vertical movement of the bins 10.

The top level of the grid framework structure 14 comprising a grid or grid structure 15 which includes rails 22 arranged in a grid pattern across the top of the stacks 12. Referring additionally to FIG. 3, the rails or tracks 22 guide a plurality of load handling devices 30. A first set 22a of parallel rails 22 guide movement of the robotic load handling devices 30 in a first direction (for example, an X-direction) across the top of the grid framework structure 14, and a second set 22b of parallel rails 22, arranged perpendicular to the first set 22a, guide movement of the load handling devices 30 in a second direction (for example, a Y-direction), perpendicular to the first direction. In this way, the rails 22 allow movement of the robotic load handling devices 30 laterally in two dimensions in the horizontal X-Y plane, so that a load handling device 30 can be moved into position above any of the stacks 12.

The upright columns of the grid framework structure are interconnected at their top ends by the rails or tracks intersecting in the grid. The intersections of the rails or tracks in the grid structure are generally termed 'nodes' of the grid structure. Typically, the first and second set of rails comprise individual elongated rail or track sections that are interconnected together in the first and second direction at the interconnections where the track or rail sections meet at the top ends of the upright columns. The rails or tracks typically comprise an elongated element which is profiled to guide a load handling device on the grid structure and are typically profiled to provide either a single track surface so as to allow a single load handling device to travel on the track or a double track so as to allow two load handling devices to pass each other on the same track. In the case, where the elongated element is profiled to provide a single track, the track comprise opposing lips (one lip on one side of the track and another lip at the other side of the track) along the length of the track to guide or constrain each wheel from lateral movement on the track. In the case where the profile of the elongated element is a double track, the track comprise two pairs of lips along the length of the track to allow the wheels of adjacent load handling devices to pass each other in both directions on the same track. To provide two pairs of lips, the track typically comprises a central ridge or lip and a lip either side of the central ridge. In all cases, when traversing on the grid structure, the wheels of the load handling device are constrained on both sides or faces of the wheels of the load handling device. The multiple lips on a single track places a burden on the dimensional tolerances of the profile of the track, in particular the connections between adjacent tracks in the grid structure. Any disparity between the profiles of adjacent tracks due to manufacturing tolerances has an impact on the smooth transition of the guide surfaces between the adjacent tracks. The problem is particularly, paramount for a dual or double track. In a worst case scenario, the wheels of the load handling device may become over constrained by the guides either side of the wheels leading to instability of the load handling device traversing on the tracks and in some cases, derailing of the load handling device.

WO2018/146304 (Autostore Technology AS) teaches a rail arrangement for wheeled vehicles in a storage system, where the trail arrangement comprises a first set of parallel rails and a second set of parallel rails. The first and second sets of parallel rails form a grid where the second set is arranged perpendicular to the first set and intersect the first set at their crossroads, thus forming a grid of parallel rails. The crossroads of the intersecting rails correspond to the interconnections of the upright columns. Each of the rails of both sets of rails comprises two parallel tracks adapted for guiding the wheels of the vehicles or load handling devices. The rails or tracks comprise a number of longitudinal segments or sections with two edge ridges running along each longitudinal edge of the longitudinal segments and a central ridge running parallel with the edge ridges. The area between the ridges forms the tracks for receiving and guiding the wheels of the vehicles. The width of the central ridge is adapted to ensure that two vehicles can pass each other when running on the tracks in different directions on the same segment. The edge ridges of each intersecting rail are in contact with each other, forming a corner ridge. The corner ridges are arranged tightly connected in order to prevent the vehicle from snagging at the joints. In order for the vehicles have a smooth drive across the intersections, the corner ridges are rounded at the insides.

A known load handling device 30 shown in FIGS. 4 and 5 comprising a vehicle body 32 is described in PCT Patent Publication No. WO2015/019055 (Ocado), hereby incorporated by reference, where each load handling device 30 only covers one grid space of the grid framework structure 14. Here, the load handling device 30 comprises a wheel assembly comprising a first set of wheels 34 consisting of a pair of wheels on the front of the vehicle body 32 and a pair of wheels 34 on the back of the vehicle 32 for engaging with the first set of rails or tracks to guide movement of the device in a first direction and a second set of wheels 36 consisting of a pair of wheels 36 on each side of the vehicle 32 for engaging with the second set of rails or tracks to guide movement of the device in a second direction. Each of the sets of wheels are driven to enable movement of the vehicle in X and Y directions respectively along the rails. One or both sets of wheels can be moved vertically to lift each set of wheels clear of the respective rails, thereby allowing the vehicle to move in the desired direction on the grid.

The load handling device 30 is equipped with a lifting device or crane mechanism to lift a storage container from above. The crane mechanism comprises a winch tether or cable 38 wound on a spool or reel (not shown) and a grabber device 39. The lifting device comprises a set of lifting tethers 38 extending in a vertical direction and connected nearby or at the four corners of a lifting frame 39, otherwise known as a grabber device (one tether near each of the four corners of the grabber device) for releasable connection to a storage container 10. The grabber device 39 is configured to releasably grip the top of a storage container 10 to lift it from a stack of containers in a storage system of the type shown in FIGS. 1 and 2.

The wheels 34, 36 are arranged around the periphery of a cavity or recess, known as a container-receiving recess or container receiving space 41, in the lower part. The recess is sized to accommodate the container 10 when it is lifted by the crane mechanism, as shown in FIG. 5 (a and b). When in the recess, the container is lifted clear of the rails beneath, so that the vehicle can move laterally to a different location. On reaching the target location, for example another stack, an access point in the storage system or a conveyor belt, the bin or container can be lowered from the container receiving portion and released from the grabber device.

However, whilst attempts have been made to ensure that the vehicle or load handling device has a smooth drive across the intersections of the rail segments or sections, each segment or section of the track is cut at right angles and joined together. The rails or tracks are extruded from metal, e.g. aluminium. Sometimes a gap is left in between the ends of adjacent tracks for the purpose of thermal expansion of the rail segments or sections. The cut of the rail sections is such that the gap perpendicularly intersects the track. In WO2018/146304 (Autostore Technology AS), when making the intersection between the first and second sets of rails or tracks, the second set of rails or tracks all comprise a recess into which the first set of rails or tracks may be arranged. The first set of rails comprise areas where there are no ridges so that when received in the recess of the second set of rails; the area is coincident with the recesses of the second set of rails, thus providing the intersection areas/crossroad of the grid. The recess of the second set of rails have right angle cuts so that when joined with the first set of rails, the joint at the intersections are at right angles to the longitudinal direction of the rails, i.e. extend across the width of the rails or tracks. As a result, the joint at the intersections tends to present a small step to an oncoming vehicle travelling on the rails or tracks. When a vehicle approaches a track joint at the intersections, the wheels of the vehicle tend to snag or strike the edge of the rails or tracks as it crosses the sets of rails. Although the vertical displacement of the wheel is minute as the vehicle travels across the intersections, this up and down bumping impact to the wheels is one of the main source of noise and vibration of the travelling vehicle or load handling device. In a worst case scenario, the bumping of the wheels on the rails or tracks imparts wear and tear not only to the wheel or tyres of the vehicles but also to the rails or tracks to the extent that damage is caused to either or both the wheels and rails. The bumping is exacerbated when there is a gap between the intersecting sets of rails or tracks. In this case, when a vehicle approaches a track joint, the wheel will sink in to the gap once it passes the first set of rail. Because of the narrow gap, as the wheel sinks down, it will strike the edge of the next section of the track. After the wheel rolls over the gap, it rises to the surface of the next section of the track.

In addition, multiple rail or track sections are necessary to build the track or rail. The greater the number of rail or track sections necessary to build the track, the more complicated the assembly of the rail or track. In a majority of cases, there is a two to one relationship between the number of rail or track sections or segments at each of the nodes or the intersections of the track or rail sections in the grid structure—in the sense that multiple rail or track sections are connected together at each node of the grid structure. For example, in WO2018/146304 (Autostore Technology AS), when making the intersections between the first and second sets of rails or tracks, the second set of rails or tracks all comprise a recess into which the first set of rails or tracks may be arranged. Additionally, to provide a plurality of rectangular or square shaped grid cells 17, multiple different sized track or rail sections are connected together in the grid structure. For example, for each grid cell there is a rail or track section extending in one direction of one length and another track or rail section extending in a second direction of a different length. The different lengths of the rail or track sections meet at a node in the grid structure where they intersect. The need to have different lengths of rail or track sections complicates the assembly of the track or rail sections in a grid pattern.

A track or rail is thus required that would not only mitigate the bumping of the wheels of the load handling device as it travels across the junctions between two intersecting sets of rails or tracks, but also require the use of a smaller number of rail or track sections when assembling the track.

This application claims priority from GB patent application numbers GB2012740.3 filed 14 Aug. 2020, GB2012751.0 filed 14 Aug. 2020, GB2013968.9 filed 4 Sep. 2020, GB2016081.8 filed 9 Oct. 2020, and GB2016097.4 filed 9 Oct. 2020, the contents being herein incorporated by reference.

SUMMARY OF INVENTION

The problem of over constraining the wheels of the load handling device on a dual or double track has been mitigated by constraining only one face or side of the wheels of the load handling device on a dual track as opposed to two faces of each of the wheels, as in prior art tracks. For a set of parallel tracks, constraining only one side of the wheels prevent lateral movement of the load handling device as it traverses on the set of parallel tracks. As a result, for a dual track, each track comprises only two guide surfaces extending from the track surface, each guide surface being configured to direct the wheels of a respective load handling device to substantially prevent lateral movement of the load handling device as it traverses the track.

The present invention provides a system for guiding the movement of one or more load handling devices in operation comprising:
  a) a first set of parallel tracks and a second set of parallel tracks, the first and second sets of parallel tracks sharing a common track, each track of the first and second set of parallel tracks providing a track surface,
  b) a first load handling device and a second load handling device, the first and second load handling devices comprising a wheel assembly for respectively engaging with the track surface of the first and second set of parallel tracks such that the wheel assembly of the first and second load handling device is configured for engaging with the track surface of the common track;
  wherein each track of the first and second set of parallel tracks comprises only two guide surfaces extending from the track surface for guiding the first and second load handing devices along their respective first and second sets of parallel tracks.

In the present invention, only one face or side of the wheels is constrained to prevent lateral movement of the load handling device in one direction. For a set of parallel tracks constraining only one face or side of the wheels either side of the load handling device, the load handling device is thus prevented from lateral movement in directions transverse to the direction of travel of the load handling device on the track, i.e. prevented from being derailed. To achieve this function, each track of a set of parallel tracks comprises only two guide surfaces extending from the track surface of the track, each guide surface of the only two guide surfaces constraining only one face or side of the wheel of the load handling device to prevent lateral movement. For a dual track where the wheels of adjacent load handling devices pass each other on the same track, the system comprises a first set of parallel tracks and a second set of parallel tracks, the first and second sets of parallel tracks sharing a common track such that the wheel assemblies of the first and second load handling devices are configured to engage with the track surface of the common track, i.e. pass each other. The only two guide surfaces extending from the track surface are configured for guiding the first and second load handing devices along their respective first and second sets of parallel tracks.

Preferably, the only two guide surfaces of the first and second set of parallel tracks are configured to guide the first load handling device along a first path of the common track and the second load handling device along a second path of the common track such that the first load handling device is constrained to substantially prevent lateral movement of the first load handling device into the second path of the common track, and the second load handling device is constrained to prevent lateral movement of the second load handling device into the first path of the common track. By having a dual track, the wheels of adjacent load handling devices (first and second load handling devices) travel along their respective paths of the common track. More specifically, a first load handling device traverses along a first path of the common track and a second load handling device traverses along a second path of the common track. The only two guide surfaces of each track of the first and second set of parallel tracks are such that the wheels of the first load handling device are constrained to prevent the first load handling device traversing into the second path of the common track, and the wheels of the second load handling device are constrained to prevent the second load handling device traversing into the first path of the common track, i.e. the first and second load handling devices are prevented from crossing paths on the common track.

Preferably, the first set of parallel tracks comprises a first track disposed laterally on one side of the common track and the second set of parallel tracks comprise a second track disposed laterally on the other side of the common track, wherein a single guide surface of the only two guide surfaces of the first track guides the first load handling device along the first path of the common track and a single guide surface of the only two guide surfaces of the second track guides the second load handling device along the second path of the common track. The tracks either side of the common track prevent the wheels of adjacent load handling devices traversing on their respective first and second set of parallel tracks from crossing paths on the common track shared by the first and second set of parallel tracks.

Preferably, the only two guide surfaces are provided by only one or only two lips extending from the track surface. In one aspect of the present invention, preferably the only two guide surfaces are provided by a single lip either side or on opposing sides of the track surface such that the track surface extends continuously between the single lip either side of the track. This removes the need to have a central ridge or lip extending along the length of the track, simplifying the cross sectional profile of the track surface. As a result, the track surface also extends continuously between the single lip either side of the track surface such that the wheels of adjacent load handling devices are not constrained on both sides of the wheels but only on one side. To achieve this, preferably the single lip comprises an inner surface facing inwardly of the track surface and an outer surface facing outwardly of the track surface such that the wheel assembly of each of the first and second load handling devices are guided in operation along their first and second set of parallel tracks by the inner surface of the single lip of their respective track. The inner surface of the single lip provides a single guiding surface for the wheels of each of the adjacent load handling devices.

In another aspect of achieving the function of constraining only one face or side of the wheels on the tracks, preferably the only two guide surfaces are provided by two lips extending centrally of each track of the first and second sets of tracks, each lip of the only two lips providing a single guiding surface facing outwardly towards an edge of the track such that the wheel assembly of each of the first and second load handling devices are guided by the outer surface of each of the respective lip of the only two lips. In this configuration, the two lips centrally of each track are spaced apart or laterally disposed. The outer surface of each lip of the two lips provides a single guiding surface for constraining only one side or face of the wheels of adjacent load handling devices. Thus, instead having the inner surface of the lips at the edges of the tracks guiding only one side or face of the wheels of the load handling device, the only two guiding surfaces are moved to the centre of the track such that the outer surface of the only two lips provide the single guiding surface for guiding the wheels of adjacent load handling devices on the track.

In another aspect of the present invention, instead of having two lips centrally on the track providing the only two guide surfaces, preferably, the only two guide surfaces are provided by a single lip extending centrally of each track of the first and second sets of tracks, the single lip providing a single guiding surface either side of the single lip such that the wheel assembly of each of the first and second load handling devices are guided by the respective single guide surface of the single lip.

Preferably, each of the first and second load handling devices comprises a vehicle body and the wheel assembly comprises at least one wheel either side of the vehicle body for respectively engaging with the first and second sets of parallel tracks. For example, as discussed in the introduction, the wheel assembly comprises a first set of wheels at the front and back of the vehicle body and a second set of wheels at the sides of the vehicle body. For example, the first set of wheels of the first load handling device are engageable with the first set of parallel tracks and the first set of wheels of the second load handling device are engageable with the second set of parallel tracks, the first and second sets of parallel tracks extending in a first direction. Similarly in the second direction, the second set of wheels of the first load handling device are engageable with a first set of parallel tracks and the second set of wheels of the second load handling device are engageable with a second set of parallel tracks, the first and second sets of parallel tracks extending in a second direction, transverse to the first direction. The first and second set of parallel tracks form part or a portion of a grid pattern comprising intersecting tracks. Thus, preferably, the first and second set of parallel tracks define a first track assembly extending in a first direction, and the system further comprises a second track assembly comprising a first and second set of parallel tracks extending in a second direction, the first direction being transverse to the second direction such that the first and second track assembly are arranged in a grid pattern comprising a plurality of grid cells. The tracks of the first and second track assembly are arranged in a grid pattern to define a grid structure for one or more load handling devices to traverse in two transverse directions on the grid structure. Thus, depending on the direction of the load handling device on the tracks, the first or second sets of wheels are engaged with the sets of parallel tracks of the first track assembly or the second track assembly.

Preferably, the first and second set of parallel tracks are supported by a plurality of vertical uprights arranged to form a plurality of vertical storage locations for one or more containers to be stacked between the vertical uprights and be guided by the vertical uprights in a vertical direction. Preferably, the plurality of vertical uprights are interconnected at their top ends by the first set of parallel tracks and the second set of parallel tracks. Equally, the first and second sets of parallel tracks are supported by first and second sets of parallel track supports or grid members such that the plurality of vertical uprights are interconnected at their top ends by the first and second sets of parallel track supports. Optionally, the first and second sets of parallel tracks are mountable to the first and second sets of parallel track supports or grid members, or alternatively, the first and second sets of parallel tracks are integrated into the first and second sets of parallel track supports or grid members, e.g. formed as a single body.

Preferably, each track of the first and second set of parallel tracks comprises a plurality of interconnected track sections. Each track section comprises an elongated element providing a track surface. Multiple track sections are connected together to provide a first track assembly and a second track assembly.

The system is a storage system comprising one or more containers stacked between the plurality of vertical uprights.

DESCRIPTION OF DRAWINGS

Further features and aspects of the present invention will be apparent from the following detailed description of an illustrative embodiment made with reference to the drawings, in which.

DETAILED DESCRIPTION

Figure 6:
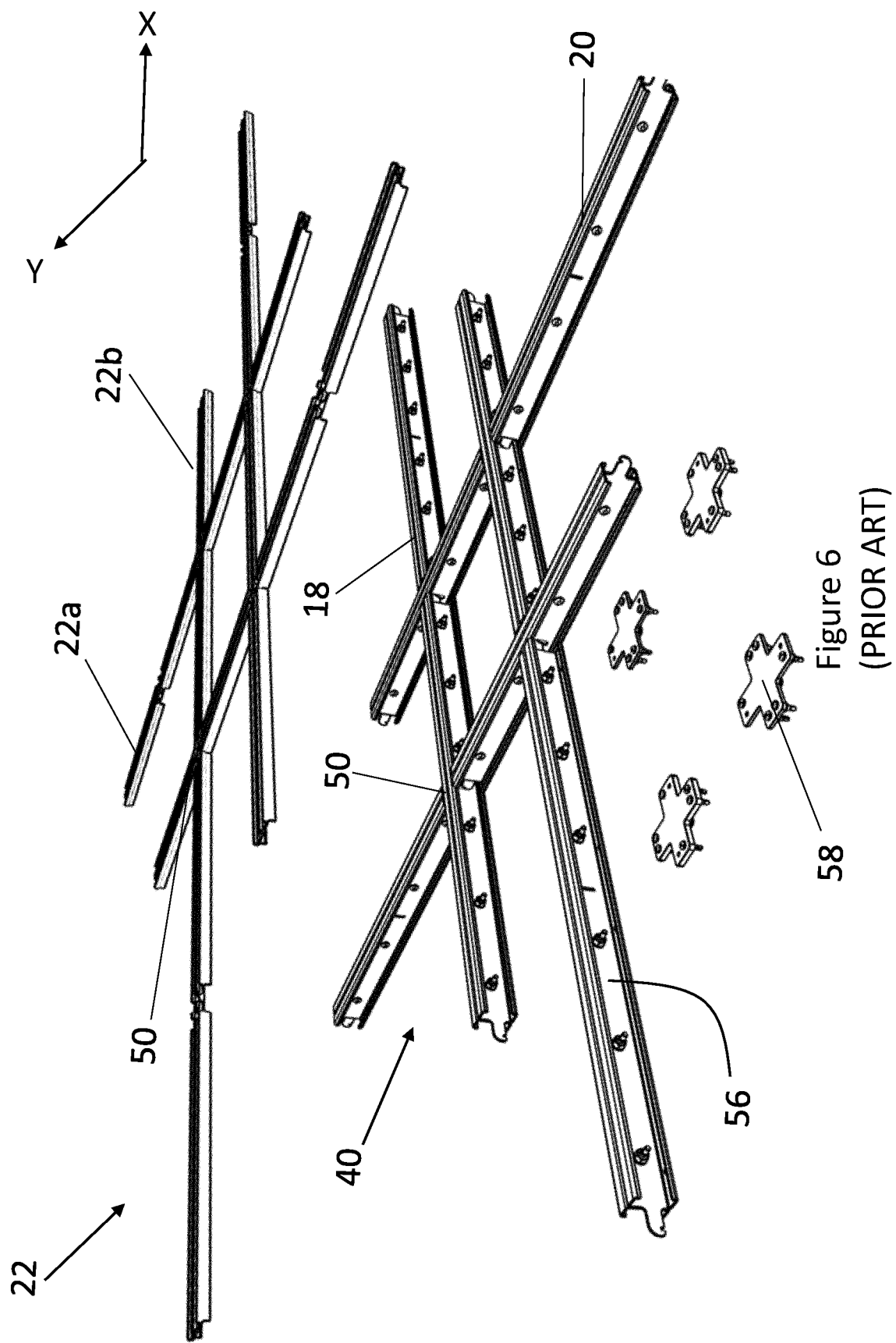
FIG. 6 is a perspective view showing the arrangement of the tracks and track supports (grid members) interconnected at their nodes or intersections by a cap plate.

It is against the known features of the storage system such as the grid framework structure and the load handling device described above with reference to FIGS. 1 to 5, that the present invention has been devised. The term "upright member(s)", "vertical upright(s)" and "upright column(s)" are used interchangeably in the description to mean the same thing. FIG. 6 shows a grid structure 40 and a track or track assembly 22 mounted thereon for guiding the movement of one or more load handling devices. For the purpose of explanation of the present invention, the grid structure 40 comprises a first set of parallel grid members 18 extending in a first direction (nominally X direction) and a second set of parallel grid members 20 extending in a second direction (nominally Y direction), the first direction being transverse, e.g. substantially perpendicular, to the second direction to form a plurality of rectangular or square frames constituting grid cells. More specifically, a first a set of grid members extend in a first direction and a second set of grid members extend in a second direction, the second set of grid members running transversely to the first set of grid members in a substantially horizontal plane, i.e. the grid structure is represented by Cartesian coordinates in the X and Y direction. In the particular embodiment of the present invention, each of the grid members can comprise or function as a track support 18, 20 whereby the track or rail 22a, 22b is mounted to the track support 18, 20. The track supports 18, 20 are arranged in the grid structure so that they intersect at nodes, i.e. the first set of track supports 18 intersect with the second set of track supports 20 at nodes 50. A load handling device is operative to move along the track or rail 22a, 22b of the present invention.

Figure 7:
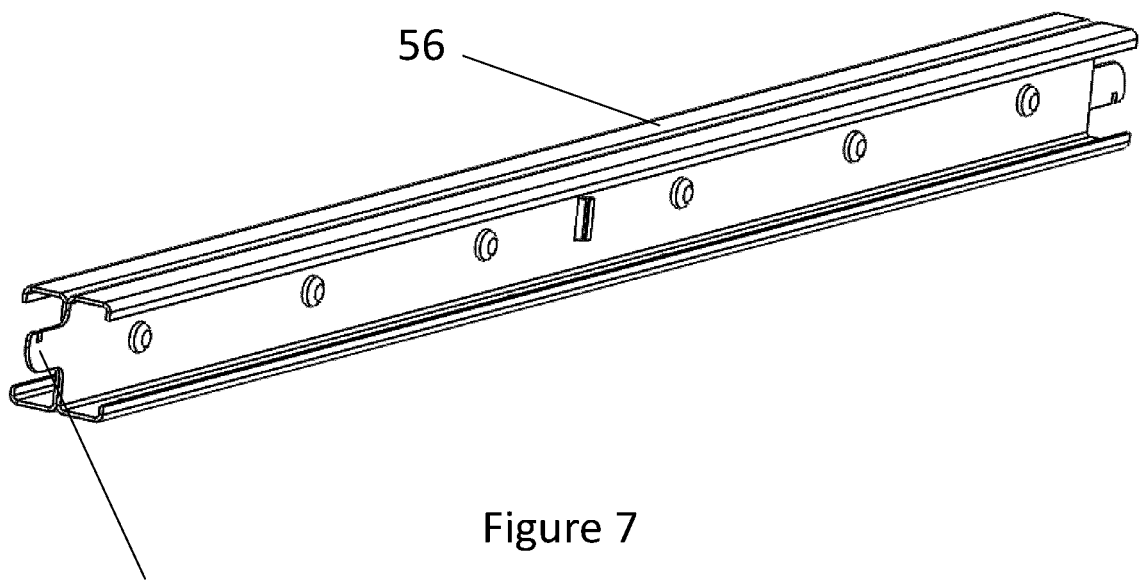
FIG. 7 is a perspective view of a track support (grid member).

As shown in FIG. 6, the grid members are sub-divided or sectioned into discrete grid sections or elements 56 that are joined or linked together to form the grid member extending in the first direction or in the second direction. The individual grid sections or elements 56 are linked together at the nodes 50 of the grid structure 40. As the grid members comprise or function as a track support 18, 20, the track support can also be sub-divided into discrete track support sections or elements 56 that are linked together at the nodes to form the track support. For the purpose of explanation of the present invention, the track supports correspond to the grid members. Discrete track support sections 56 make up a track support that extend in the first direction and in the second direction. An individual track support section or element 56 used to make up the track support 18, 20 is shown in FIG. 7. The track support 18, 20 in transverse cross section can be a solid support of C-shaped or U-shaped or I-shaped cross section or even double-C or double-U shaped support. In the particular embodiment shown in FIG. 7, the track support section comprises back to back C sections that are bolted together.

Figure 8:
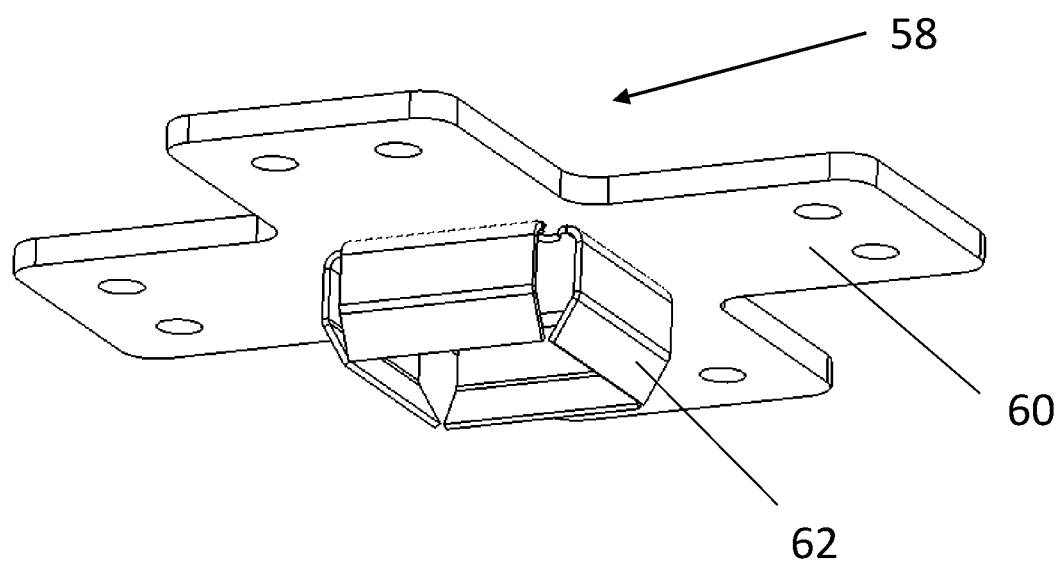
FIG. 8 is a perspective view of a cap plate for interconnecting the vertical uprights to the track supports (grid members) at the nodes.

A connection plate or cap plate 58 as shown in FIG. 8 can be used to link or join the individual track support sections or elements 56 together in both the first and the second direction at the junction where multiple track support sections cross in the grid structure 40, i.e. the cap plate 58 is used to connect the track support sections 56 together to the vertical uprights 16. As a result, the vertical uprights 16 are interconnected at their upper ends at the junction where the multiple track support sections intersect or cross in the grid structure 40 by the cap plate 58, i.e. the cap plate is located at the node 50 of the grid structure 40. For the purpose of explanation of the present invention, the point or area where the grid members or track supports intersect or cross as shown in FIG. 6 can be defined as nodes or intersections 50. It is clearly apparent from the layout of at least a portion or section of a known grid structure 40 constituting grid cells shown in FIG. 1, that each intersection or node 50 of the grid structure 40 is supported by a vertical upright 16.

Figure 9:
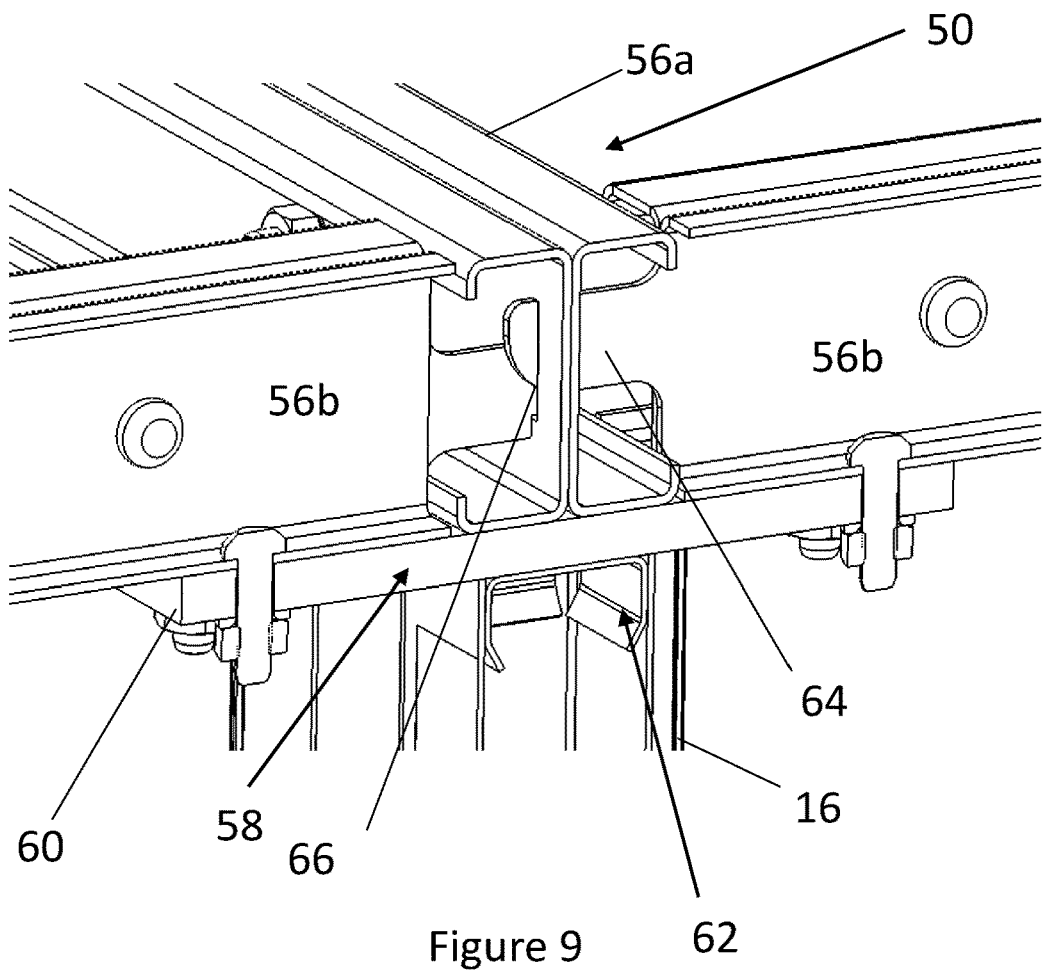
FIG. 9 is a perspective cross sectional view of the interconnection of the vertical uprights to the track supports (grid members) by the cap plate at a node.

Also shown in FIG. 6 and FIG. 8, the cap plate 58 is cross shaped having four connecting portions 60 for connecting to the ends or anywhere along the length of the track support sections 56 at their intersections 50. The interconnection of the track support sections to the vertical uprights at the nodes by the cap plate 58 is demonstrated in the cross-sectional profile of the node 50 shown in FIG. 9. The cap plate 58 comprises a spigot or protrusion 62 that is sized to sit in a hollow central section 46 of the vertical upright 16 (see FIG. 2) in a tight fit for interconnecting the plurality of vertical uprights 16 to the track support sections 56a, 56b as shown in FIG. 9. Also shown in FIG. 9 are the track support sections 56a, 56b extending in both perpendicular directions corresponding to the first direction (x-direction) and the second direction (y-direction). The connecting portions 60 are perpendicular to each other to connect to the track support sections 56a, 56b extending in the first direction and in the second direction. The cap plate 58 is configured so as to be bolted to the ends of the track support sections 56a, 56b or along the length of the track support sections. The track support sections 56a, 56b are arranged to interlock with one another at the nodes to form the grid structure 40 according to the present invention. To achieve this, distal or opposing ends of each of the track support sections 56a, 56b comprise locking features 64 for interconnecting to corresponding locking features 66 of adjacent track support sections. In the particular embodiment of the present invention, opposing or distal ends of one or more track support sections comprises at least one hook or tongue 64 that is receivable in openings or slot 66 midway of an adjacent track support section 56 at the junction where the track support sections cross in the grid structure 40. Referring back to FIG. 7 in combination with FIG. 9, the hooks 64 at the end of a first track support section 56b are shown received in an opening 66 of an adjacent second track support section 56a running perpendicular to the first track support section 56b at the intersection where the track support sections 56a, 56b are supported by the vertical upright 16. Here, the hooks 64 are offered up to an opening 66 either side of a track support section 56b. In the particular embodiment of the present invention, the opening 66 is half way along the length of the track support section 56 so that when assembled together, adjacent parallel track support sections 56 in the first direction and in the second direction are offset by at least one grid cell (see FIG. 6).

Figure 10:
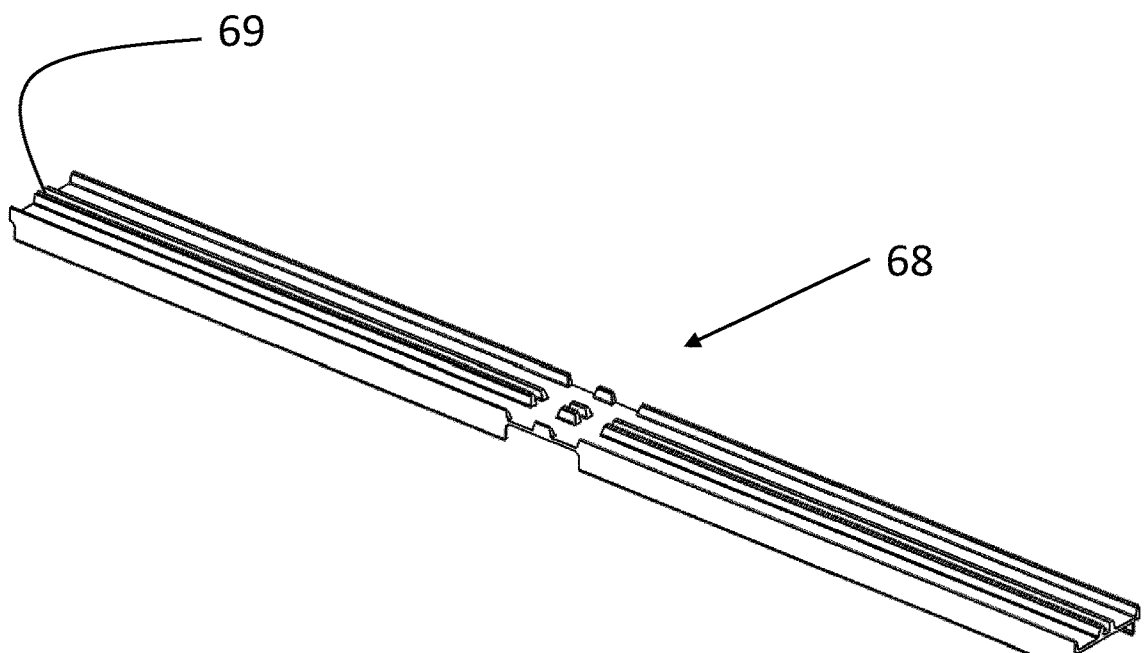
FIG. 10 is a perspective view of a track or rail configured to be mounted to the track support shown in FIG. 7.

The track support sections are interlocked together in a grid pattern to form the grid structure comprising track supports 18 extending in the first direction and track supports 20 extending in the second direction. A track 22a, 22b is mounted to the grid structure. The track 22a, 22b is either snap-fitted and/or fitted over the track support 18, 20 in a slide fit arrangement (see FIG. 6). Like the track support, the track follows a similar grid-like pattern to the grid structure in the sense that the track comprises a first set of tracks 22a extending in the first direction and a second set of tracks 22b extending in the second direction, the first direction being transverse, e.g. perpendicular, to the second direction. A first set of tracks 22a is sub-divided into multiple track sections or track elements 68 in the first direction such that when the track sections 68 are assembled together in the first direction and in the second direction a continuous track surface is provided on the grid structure for guiding the load handling device on the track. This is demonstrated in FIG. 6. An example of an individual track section 68 is shown in FIG. 10. As with the track support sections, multiple track sections in the first direction and the second direction are laid together to form a track extending in both directions. The fitting of the track section 68 to the track support 18, 20 comprises an inverted U-shaped cross-sectional profile that is shaped to cradle or overlap the top of the track support 18, 20. One or more lugs extending from each leg of the U shape profile engage with the edge of the track support 18, 20 in a snap fit arrangement. Equally plausible in the present invention is that the track 22a, 22b can be integrated into the track supports 18, 20 rather than being separate components.

When connecting individual track sections 68 together, the distal ends 69 of adjacent track sections 68 butt up against each other (see FIGS. 6 and 10). Typically, the ends 69 of the track sections are cut perpendicular to the longitudinal direction of the track section (elongated track section) 68 such that when a track section butts up against an adjacent track section as shown in FIG. 6, a small step is created between adjacent connecting track sections. Since adjacent track sections connect at the nodes 50 of the grid structure, an undesirable step is present at one or more nodes of the grid structure or where adjacent track sections intersect. When a load handling device approaches a node 50 at the intersection of the track sections 68, there is a tendency for the wheel to strike the edge of a track section causing the wheel of the load handling device to bump up and down. A gap is sometimes present between adjoining track sections to cater for the thermal expansion of the track sections which are largely composed of metal, e.g. aluminium. The wheels of the load handling device would tend to sink into the gap once it passes the end of a first track section. Because of the narrow gap, as the wheel sinks down, it will strike the edge of the next adjacent track section. After the wheel rolls over the gap, it rises to the surface of the next section of the track. Although the vertical displacement of the wheels is minute, this up and down bumping impact to the wheels is the main source of noise and vibration of the load handling devices travelling on the grid structure. The step between connecting track sections at the node is exacerbated when the underlying intersecting grid members or track supports are vertically displaced as shown in FIG. 9. The connections of the intersecting track supports or grid members 56a, 56b beneath the track are connected to a vertical upright 16 and in some examples as discussed above, using a cap plate 58. Any imperfections to the grid level or displacement of the underlying track supports are usually reflected in the track sections mounted thereon. The vertical displacement of the underlying track supports are exacerbated as the height of the vertical uprights are adjustable to adjust the level of the grid structure. Typically, the vertical uprights are mounted to an adjustable foot (not shown) comprising a threaded shaft that can be retracted or extended to adjust the level of the grid structure. This adjustment of the grid level may increase the vertical displacement of the interconnecting grid members, and therefore can be reflected to the track sections mounted thereon.

Figure 11:
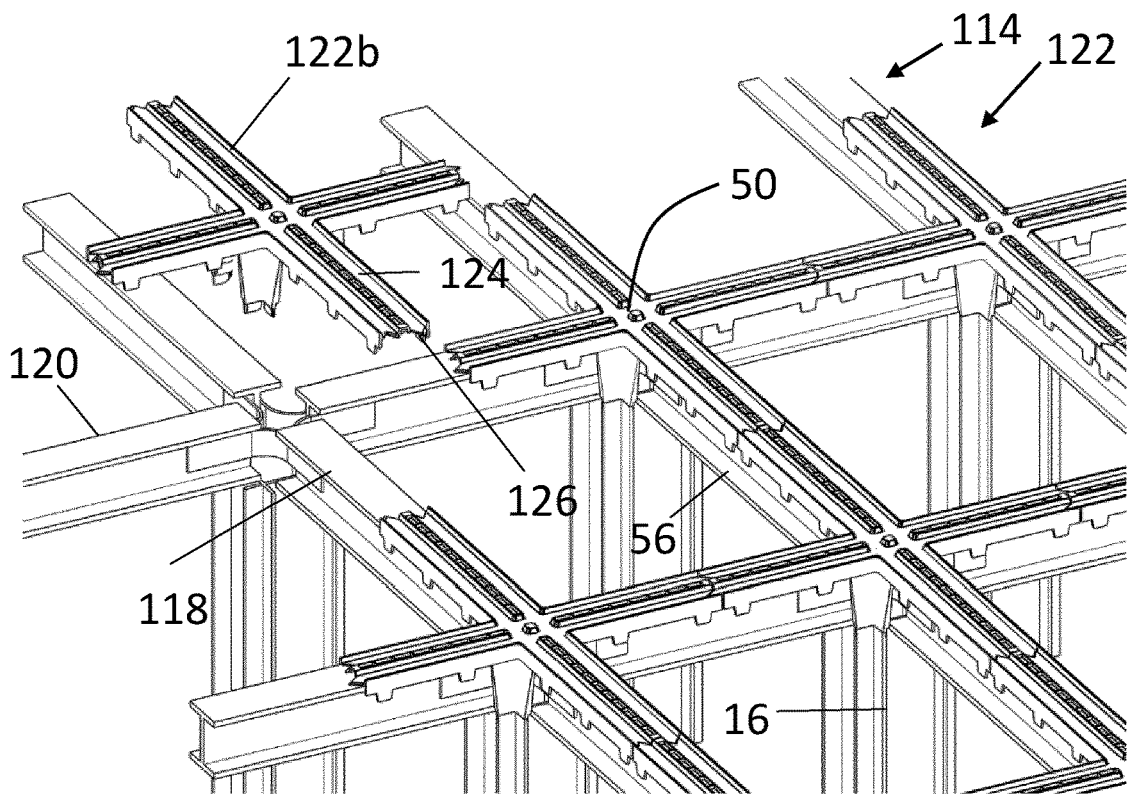
FIG. 11 is a perspective view showing the mounting of the track sections to the track supports of the grid structure according to an embodiment of the present invention.

To provide an uninterrupted track surface on the grid structure, in an aspect of the present invention, the track 122 comprises a plurality of track sections 122b, each track section 122b of the plurality of track sections 122b being formed as single unitary body and wherein adjacent track sections are arranged to meet between the nodes 50 of the grid structure 114, i.e. meet at a point 123 between the crossings of the tracks (see FIG. 11). The single piece moulding allows a one to one relationship to exist between each track section 122b and each of the nodes 50 of the grid structure in the sense that only a single track section occupies a single node of the grid structure, rather than at least two track sections as found in prior art grid structure described above and shown in FIG. 6. In the particular embodiment shown in FIGS. 11 and 12, each track section 122b has connecting portions or elements 124 that extend in the directions of the underlying track supports 118, 120 so as to provide a track surface that extends in the first direction and the second direction, i.e. each track section is cross shaped having connecting portions or elements 124 extending in transverse directions. For the purpose of explanation of the present invention, the connecting portions or track section elements 124 can be termed 'branches' that extend in transverse directions from the nodes 50.

Multiple track sections 122b are mounted to the underlying track support 118, 120 to provide a continuous uninterrupted track surface between adjacent track sections for one or more load handling devices to move on the grid structure 114. The distal ends 126 of the connecting portions or elements (branches) 124 of adjacent track sections meet substantially half way or mid-point between neighbouring nodes 50 of the grid structure 114, i.e. meet or join at the mid-point between adjacent track crossings. This has the advantage of reducing the number of differently shaped track sections necessary to assemble the track for a substantial portion of the grid structure, i.e. removes the "jigsaw" effect where a track section has a specific place in the track, and thereby reducing the time to assemble the track on the grid structure. In addition, the tooling costs to manufacture the track sections would be greatly reduced since a smaller number of tooling designs would be necessary to mould the track section of the present invention in comparison to prior art tracks.

Figure 1:
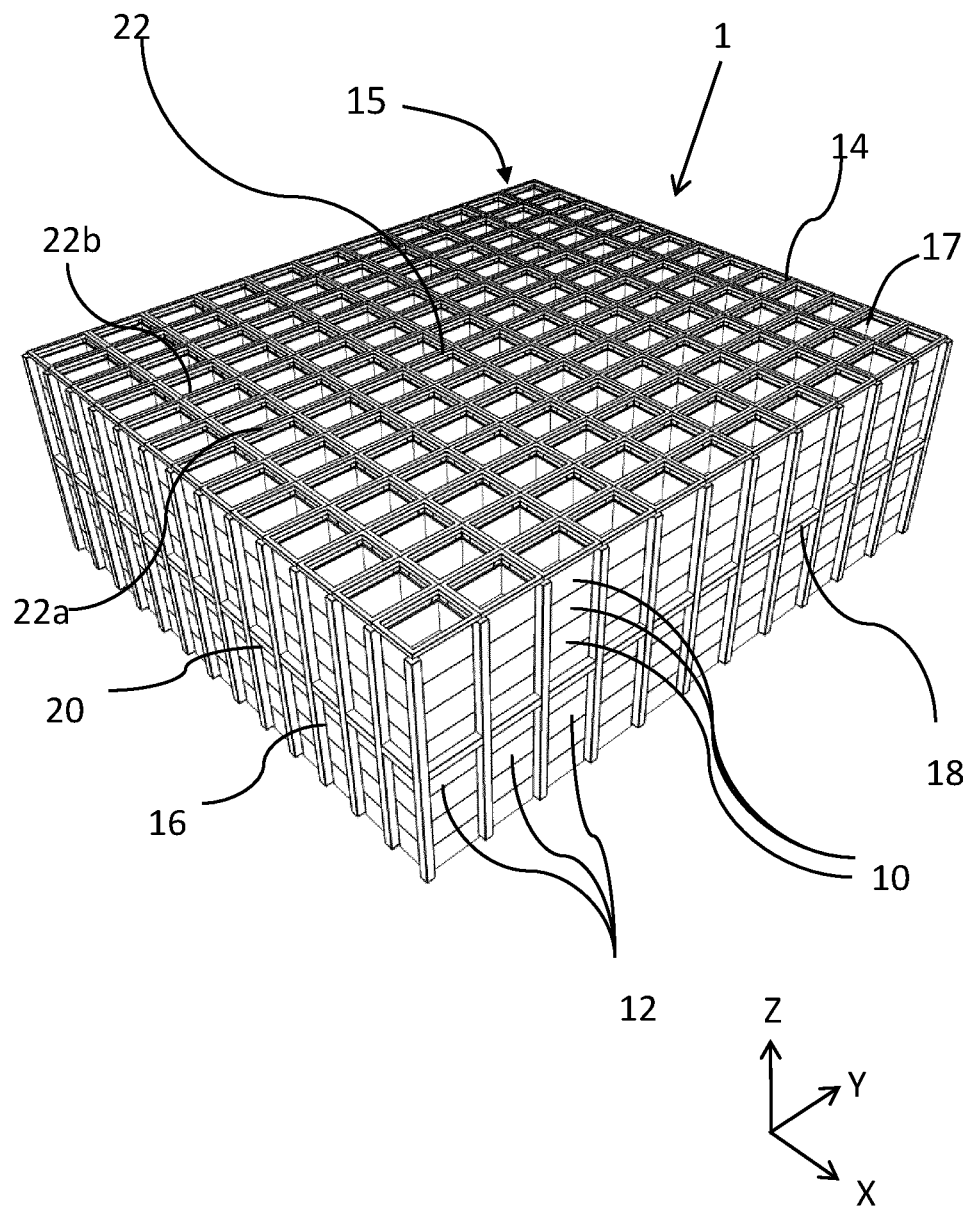
FIG. 1 is a schematic diagram of a grid framework structure according to a known system.
Figure 2:
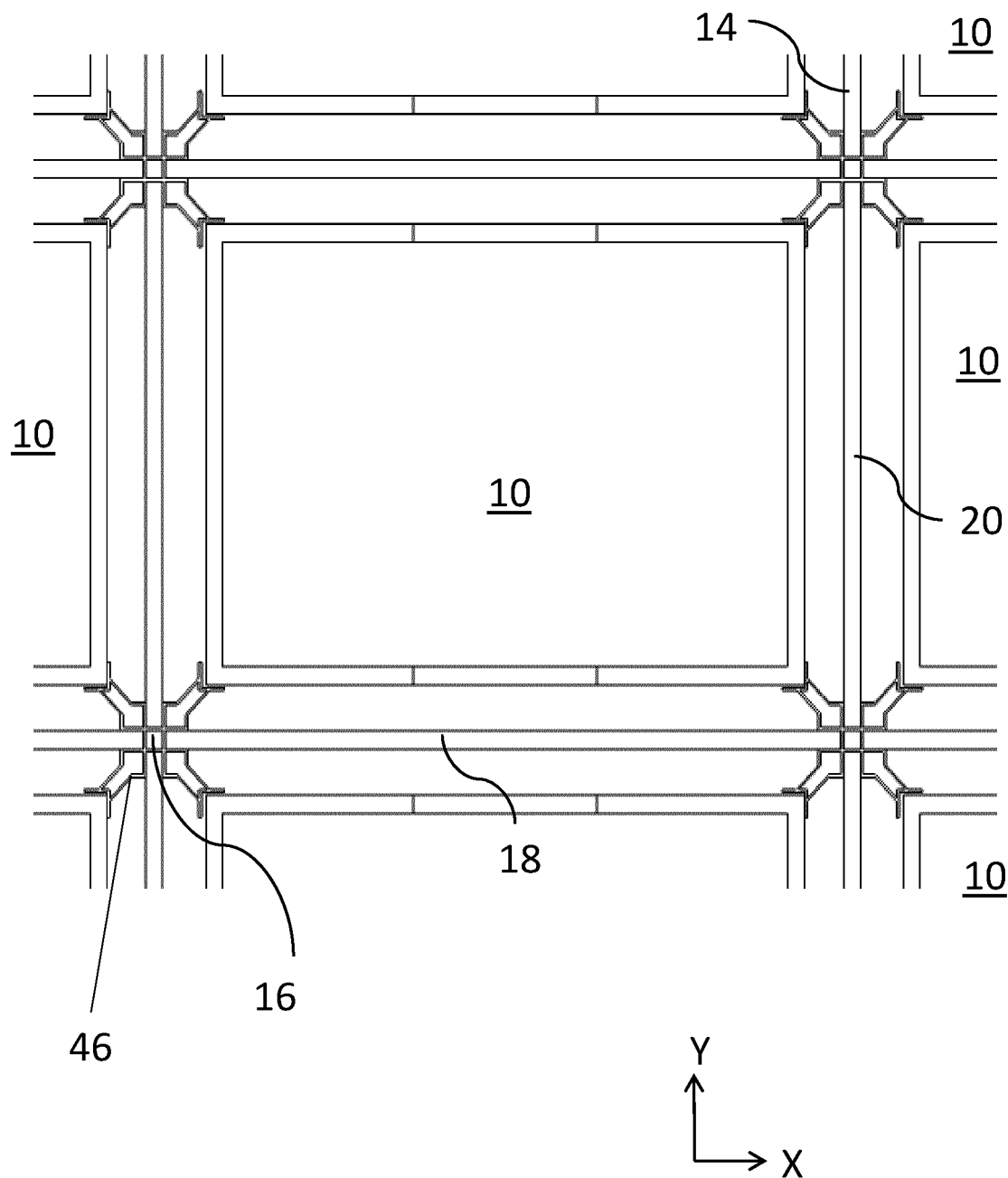
FIG. 2 is a schematic diagram of a top down view showing a stack of bins arranged within the framework structure of FIG. 1.
Figure 3:
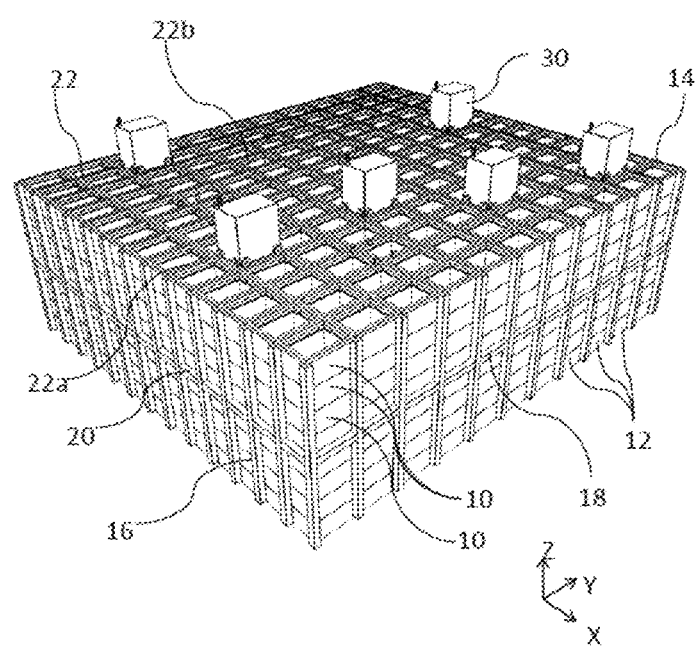
FIG. 3 is a schematic diagram of a known storage system of a load handling device operating on the grid framework structure.
Figure 4:
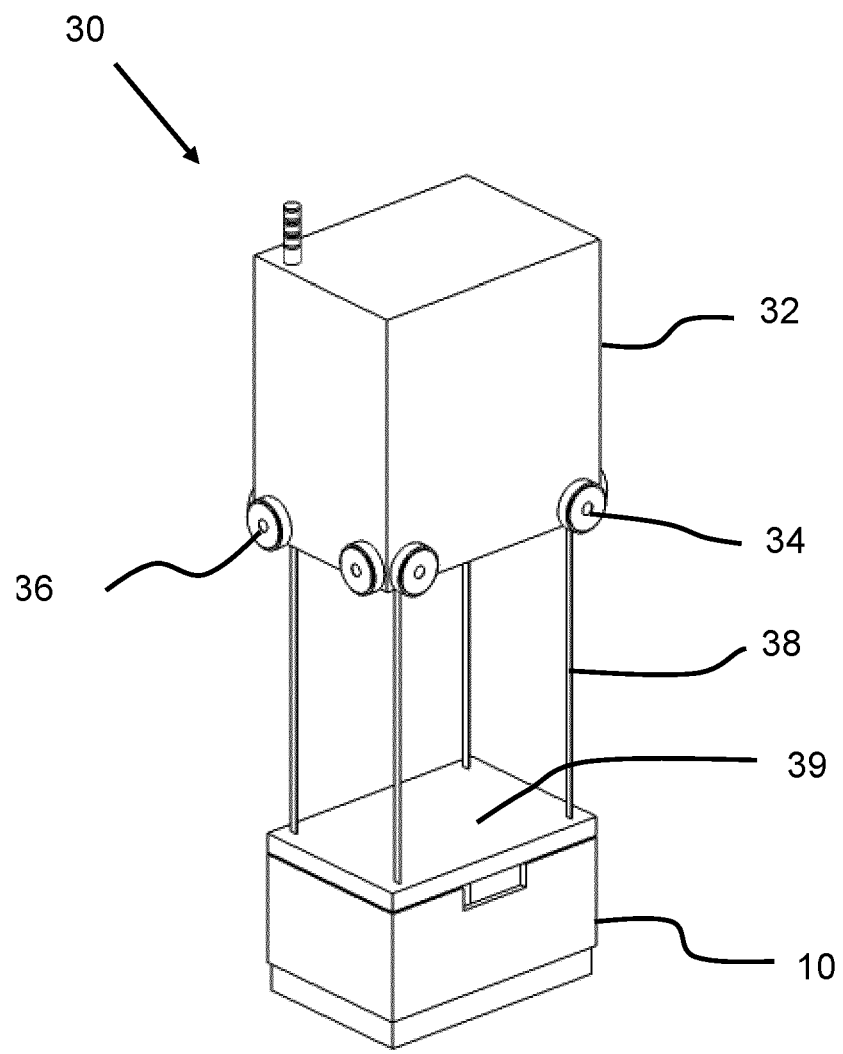
FIG. 4 is a schematic perspective view of the load handling device showing the lifting device gripping a container from above.
Figure 5:
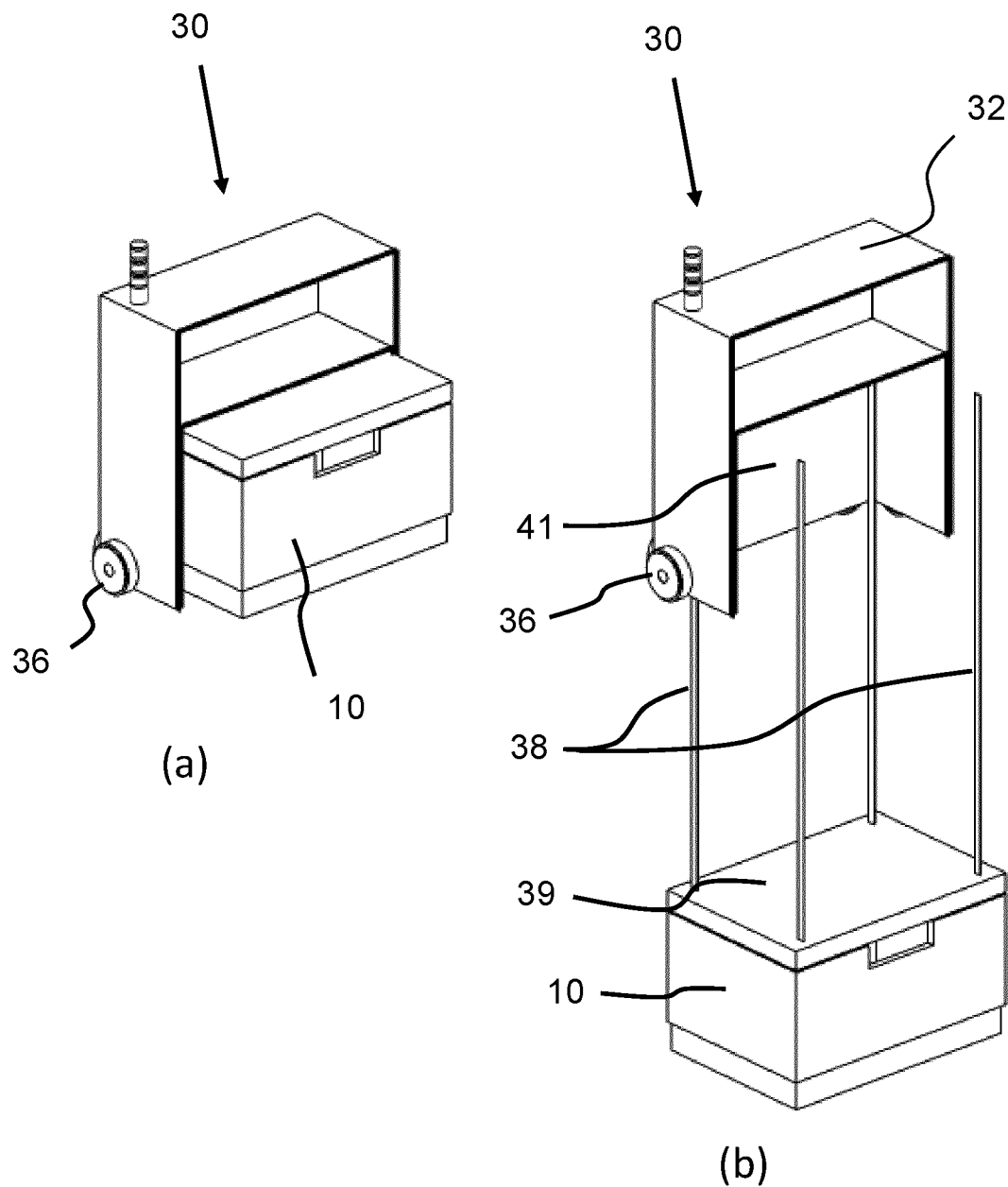
FIGS. 5(*a*) and 5(*b*) are schematic perspective cut away views of the load handling device of FIG. 4 showing (a) a container accommodated within the container receiving space of the load handling device and (b) the container receiving space of the load handling device.
Figure 12:
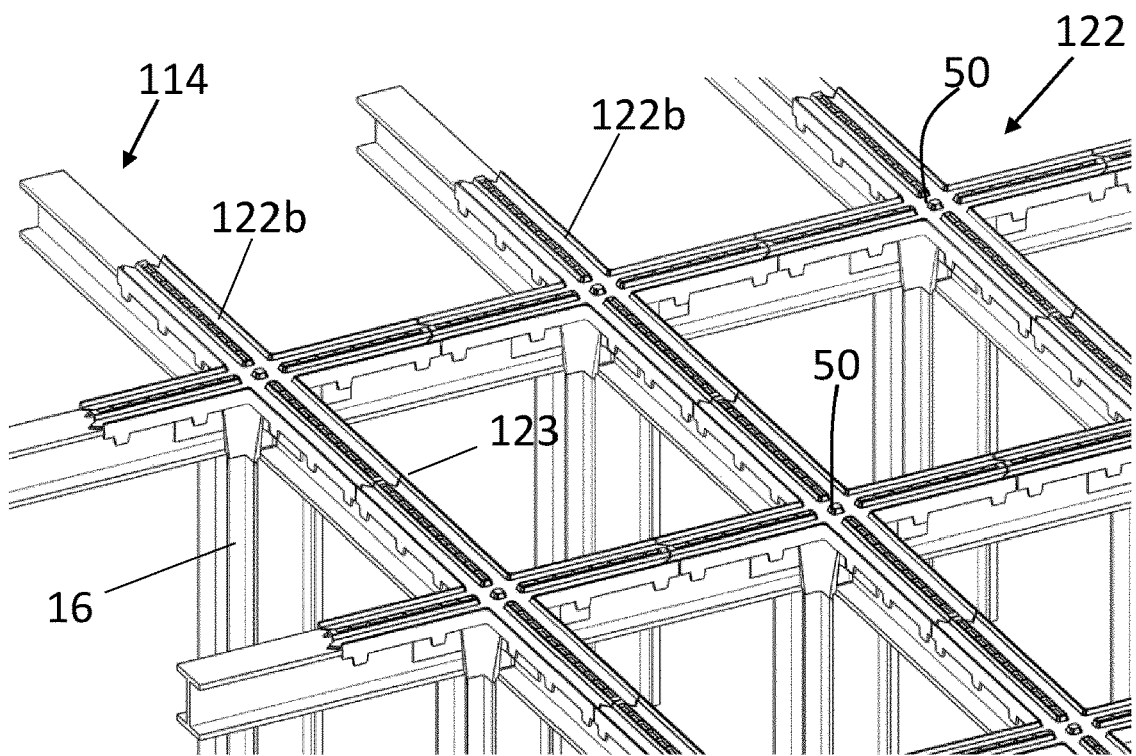
FIG. 12 is a perspective view showing the assembled track sections making up the track on the grid structure according to the embodiment of the present invention.
Figure 13:
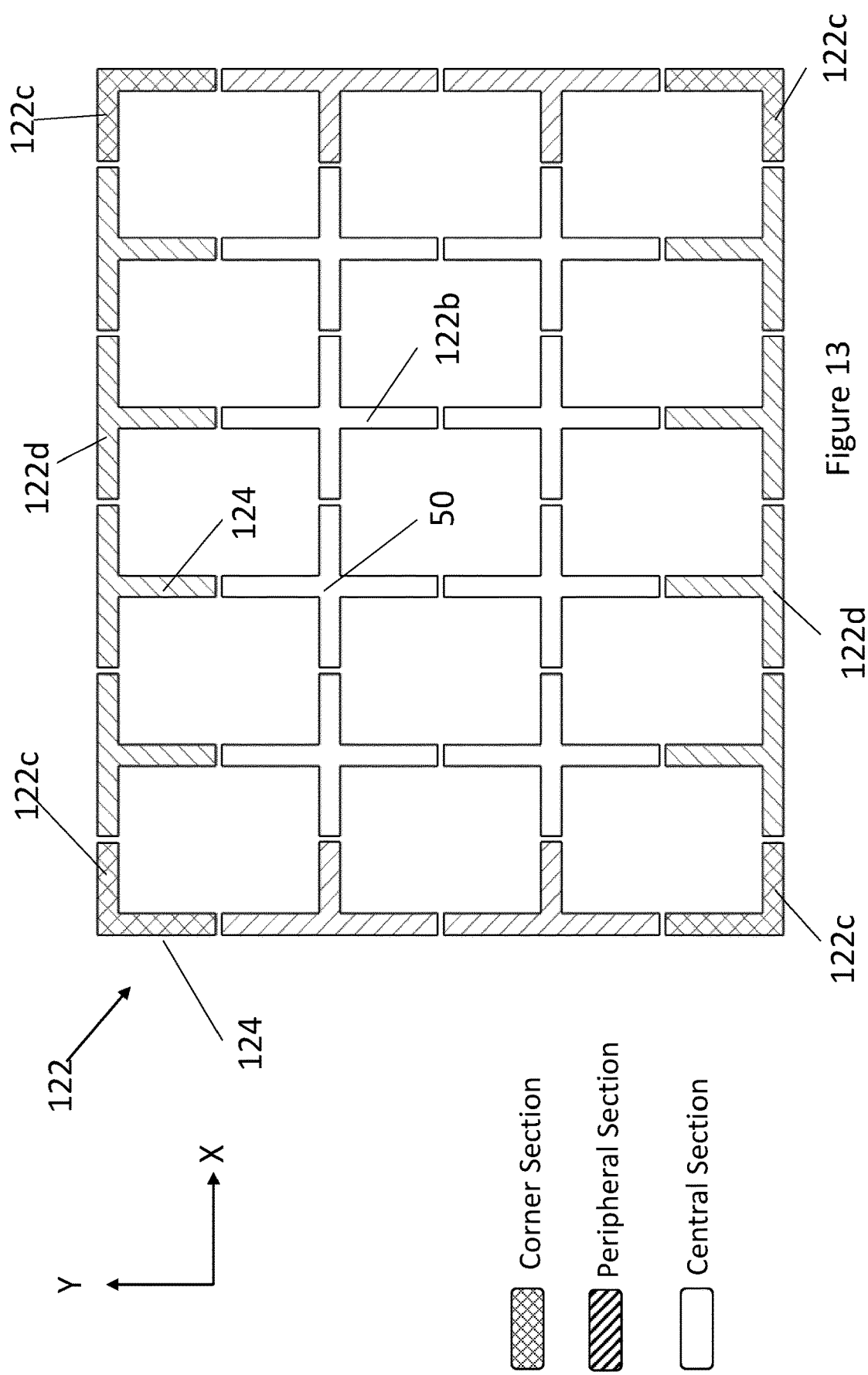
FIG. 13 is an illustration of the arrangement of track sections making up a rectilinear track according to an embodiment of the present invention.

With reference to FIG. 3, the grid framework structure can be considered as a free standing rectilinear assemblage of upright columns supporting the grid structure formed from intersecting horizontal grid members (track supports), i.e. a four wall shaped framework. As a result, the number of connecting portions or elements of the track sections (i.e. the number of meeting points or branches) at the corner and around the periphery of the track would be different to the rest of the track, where they are largely cross shaped as shown in FIG. 12 and FIG. 13. For the purpose of explanation, the different areas of the grid structure can be termed, corner section, peripheral section and central section. The different areas of the track 122 where the track 122 has a rectilinear shape is shown in the sketch drawing of the pattern of the track sections in FIG. 13. The sketch of the pattern of track sections shown in FIG. 13 is not to scale and it is simply for illustration purposes. The track sections of the corner section 122c of the track 122 is shown with a different shaded area and each of the track section 122c at the corner has two connecting portions or elements 124, i.e. two branches. The track sections at the peripheral section 122d of the track 122 is shown with a different shaded area. In the particular embodiment of the present invention shown in FIG. 13, each of the track sections 122d at the peripheral of the track comprises three connecting portions or elements 124; two extending in opposite directions along the first direction and one extending in the second direction, i.e. three branches. The track sections 122d at the peripheral sections are not limited to having three connecting portions or branches 124 and can comprise more than three connecting portions depending on whether the peripheral section extends across more than one node 50. The nodes 50 represent the areas of the track 122 where the individual track sections elements or branches intersect. For example, a peripheral section can comprise two branches extending in opposite directions along the first direction and multiple connecting points extending in the second direction for connecting to or meeting with adjacent track sections in the central section of the grid structure, i.e. more than three branches.

Figure 14:
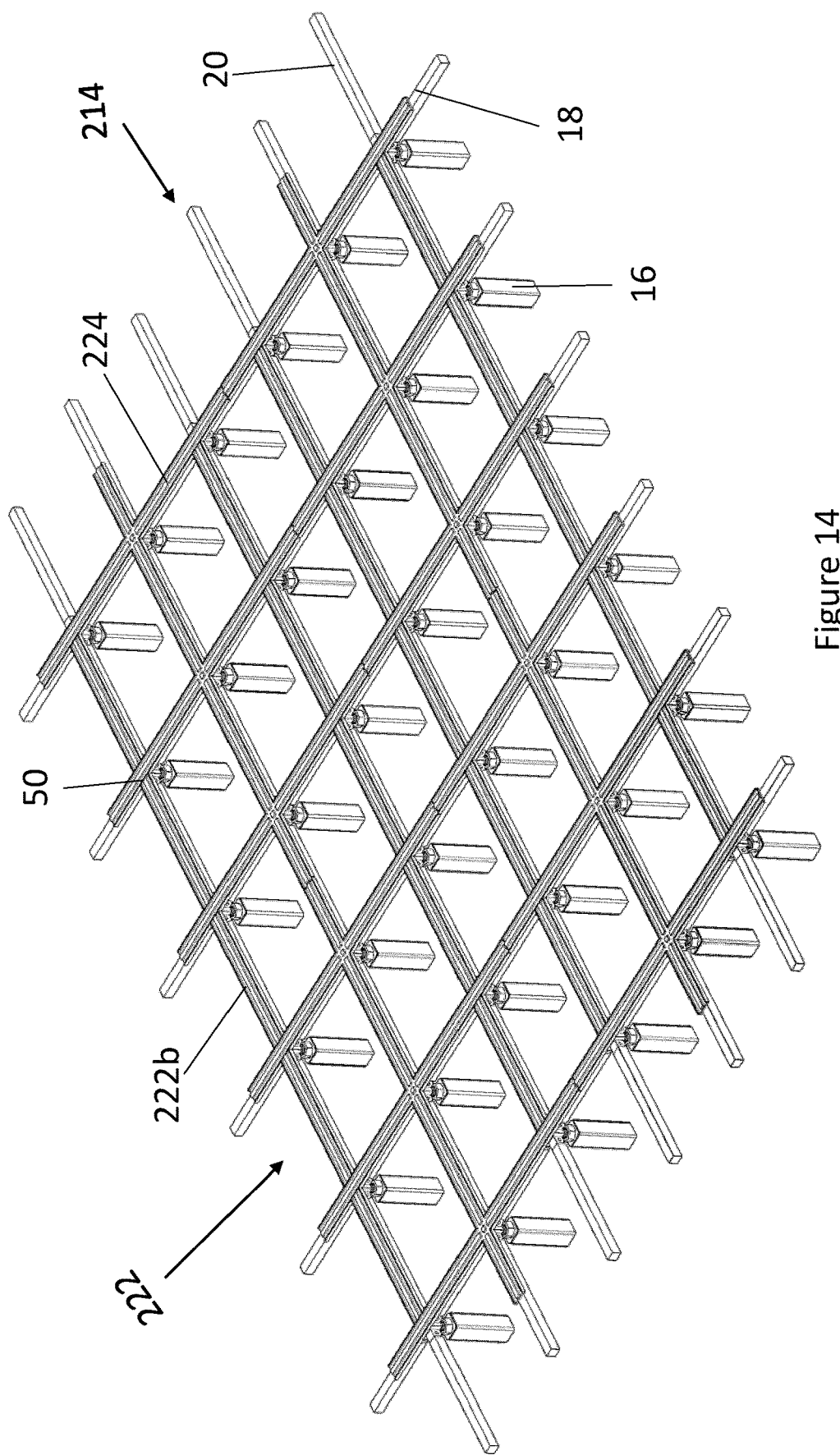
FIG. 14 is a perspective view of the pattern of track sections making up a rectilinear track according to another embodiment of the present invention.

As is clearly apparent in the schematic sketch shown in FIG. 13, a substantial portion of the track falls within the central section of the track where each of the track sections 122b is cross shaped having connecting portions or meeting points that branch or extend in transverse directions, i.e. first direction (X) and second direction (Y). In all of the differently shaped track sections 122b, 122c, 122d in the particular embodiment shown in FIG. 13, there is a one to one relationship between each of the plurality of track sections and each of the nodes 50 of the track and/or grid structure. For example, there is a one to one relationship between a track section 122c and the node 50 at the corner of the track/grid structure. Likewise, there is a one to one relationship between each of the track sections 122d and each node 50 at the periphery of the track/grid structure. A similar principle applies to the track sections 122b in the central section of the track/grid structure. However, the present invention is not limited to there being a one to one relationship between each of the plurality of track sections and each of the nodes since a single track section can extend across more than one node in the track/grid structure. For example, in the grid framework structure shown in FIG. 14, the branches or connecting elements 224b of one or more of the track sections 222b are sized to extend across one or more nodes of the grid structure 214. In the particular embodiment shown in FIG. 14, the one or more of the branches or connecting elements 224 of the track section are sized to extend across two nodes 50. The larger sized track sections 222b shown in FIG. 14 would mean that a smaller number of track sections 222b would be needed to make up the track 222, i.e. to assemble the track together. The connecting ends 226 of one or more of the branches or connecting elements 224 extend to meet between the nodes of the grid structure 214 as this is the area of the grid structure where the underlying track support or grid members 18, 20 are less susceptible to any vertical displacement as present at the nodes 50 as discussed further below. In the particular embodiment shown in FIG. 14, the distal ends 226 of the connecting track section portions or elements 224 of adjacent track sections 222b meet half way between neighbouring nodes 50 of the grid structure. The single piece track sections having a track surface or path extending in transverse directions greatly reduces the complexity and the components required to assemble the grid framework structure of the present invention. In all cases, each track section 122b, 122c, 122d, 222b is a single unitary body having portions or elements 124, 224 extending in transverse directions so as to provide a track surface or path for a load handling device to move on the grid structure extending in transverse directions.

The ability of adjacent track sections to meet half way or mid-point between neighbouring nodes 50 of the track and/or grid structure allows each adjacent track section to be mounted to the underlying track supports in different orientations as they are not restricted to one specific orientation on the grid structure. In other words, due to the symmetry, e.g. rotational symmetry, of the track section of the present invention, the track sections can be mounted to the grid structure in multiple different orientations without affecting their ability to connect to an adjacent track section on the grid structure. In the context of the present invention, the rotational symmetry is the ability to rotate the track section so that the rotated track section coincides with the un-rotated track section. In the case where the grid cells are square (equal length tracks in the X and Y direction), the rotational symmetry of the track section is such that the angle of rotational symmetry is 90° which means that the track section can be rotated four times and still coincide with itself, i.e. order of symmetry of four. In the case where the grid cells are rectangular, the rotational symmetry of the track section is two.

Figure 15:
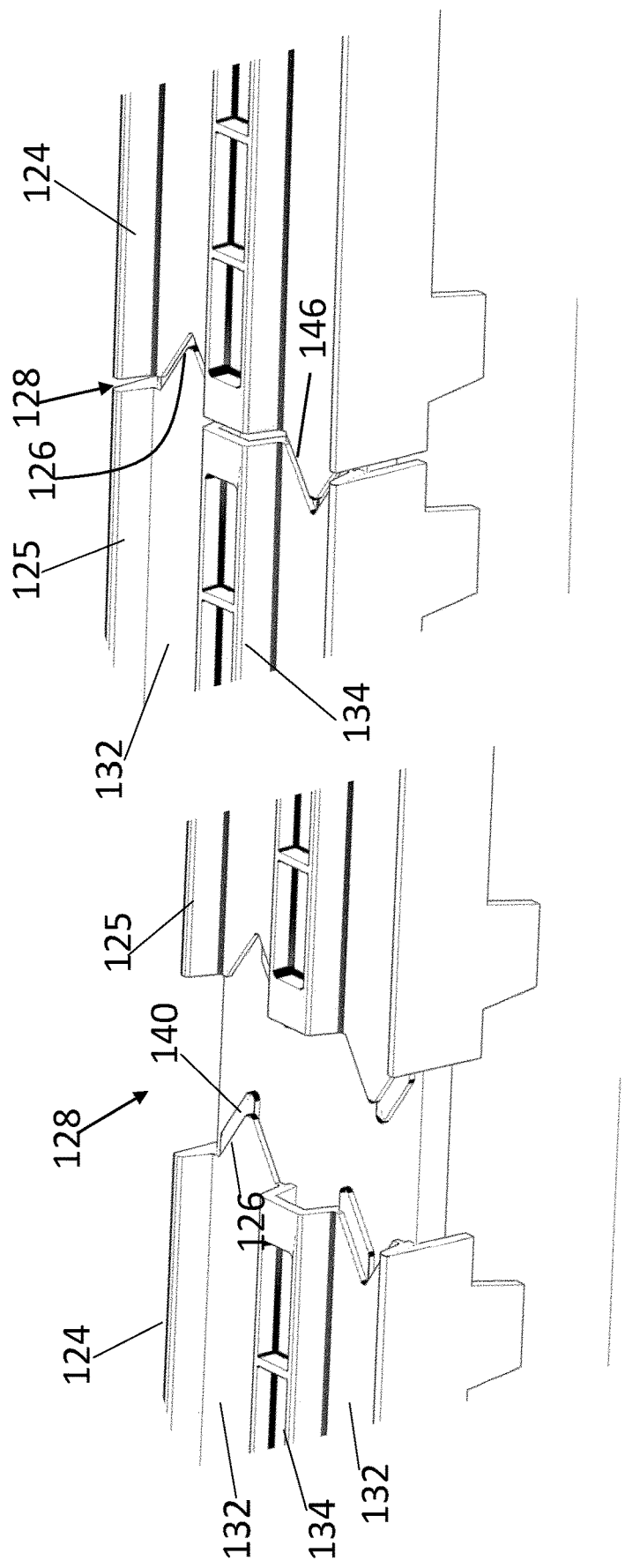
FIG. 15 (a and b) is an expanded view of the joint linking adjacent track sections together according to an embodiment of the present invention.

In the particular embodiment of the present invention shown in FIGS. 11 and 12, the distal ends 126 of the connecting track section portions or elements 124 of adjacent track sections 122b meet half way between neighbouring nodes 50 of the grid structure. This improves the speed by which each of the track sections can be assembled on the grid structure as a single track section can be mounted to each node 50 of the grid structure 114 when assembling the track 122 to the grid structure 114. The areas extending between the nodes 50 are largely not susceptible to any differences in height variation of the interlocking track supports 118, 120 in comparison to at the nodes as discussed above, and thus the track surface connecting adjacent track sections on the grid structure will not be largely influenced by any irregularities of the underlying track support sections 56 extending between the nodes 50. As a result, the surfaces between the nodes are largely flat and uninterrupted. However, to mitigate the ends of abutting track section elements 124 creating a step at the joint between adjacent track sections 122b causing a vertical displacement of the wheels of a travelling load handling device across the junction between the connecting adjacent track sections, the connecting ends 126 of the track section are mitred or is tapered as shown in FIG. 15. The joint 128 connecting adjacent track sections comprises at least one tapered edge 126 changing the conventional 90° angle cut to a substantial 45° angle cut edge. The two track section portions or branches 124 of the track sections are cut in such a manner as to be mitred together. Thus, before the wheels of the load handling device roll over the edge of a first track section portion 124 completely, part of the wheels already has touched the mitred end of a second track section portion. This provides a gradual transition of adjoining track sections and prevents the wheels from sinking into any gap between the connecting ends of adjacent track section portions.

In the particular embodiment shown in FIG. 15, the joint or the connecting ends 128 of adjacent track section portions 124 comprises multiple tapered edges 126. The edges 126 are tapered in such a manner that a track section portion or element 124 of a first track section is seated or butts up against a correspondingly shaped tapered edge 130 of a track section portion or element 124 of a second adjacent track section. In the particular embodiment shown in FIG. 15, the edges 126 of the track section portions 124 are shaped in such as manner to create a V-shaped edge that is receivable in a correspondingly shaped V-shaped cut out. The number of tapered ends 126 at the joint 128 between adjacent track sections may be dependent on the number of tracks for guiding the wheels of the load handling device. FIG. 15 shows the adjacent track sections in (a) a separated configuration and (b) a connected configuration.

Figure 16:
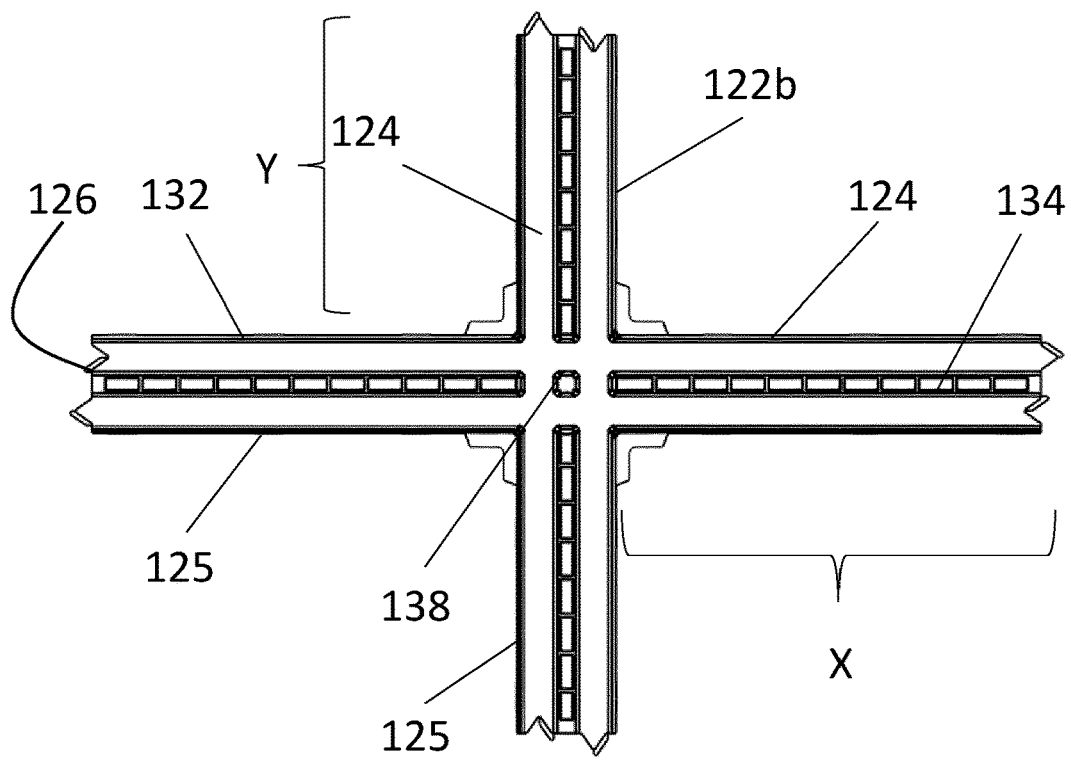
FIG. 16 is a perspective view of a single track section according to the embodiment of the present invention.

In the particular embodiment shown in FIG. 15, the track is a double track comprising two ridges or depressions 132 running side by side along the longitudinal length of each of the track section elements 124 for receiving and guiding the wheels of the load handling device and a central ridge 134 running parallel to the two ridges or depressions 132. The depressions 132 either side of the central ridge 134 provide the paths for the wheels of the load handling device to engage. Each track section element 124 for guiding the wheels of the load handing device comprises two lips 125; one at either side of the wheel. For a double track, there are two pairs of lips 125 side by side running along the longitudinal length of the track for guiding two pairs of wheels. This is to ensure that two load handling devices can pass each other in the X direction and the Y direction when running on the double track in different directions on the same track section. To allow one or more load handling devices to cross at the crossing or intersection of the track section, i.e. cross at the cross roads, which corresponds to the nodes of the grid structure, the crossing or intersection of the tracks comprises a small island 138 as shown in FIG. 16 so as to permit the wheels to be guided in transverse directions. This is particularly the case in areas where the tracks cross or intersect, which are predominantly around the central section 122*b* of the grid structure. Also shown in FIGS. 15 and 16 is an optional central ridge or rib 134 running longitudinally along the length of the track; the tracks or paths 132 for guiding the wheels of the load handling device running either side of the central ridge or rib 134. The central ridge or rib 134 is integrally formed into the track section or embossed, the underside of the track section being shaped to be seated on a correspondingly shaped ridge or rib in the underlying track support (see cross-section view of the track in FIG. 19). The central ridge or rib provides an underlying surface to key the track section to the track support and prevent sideways movement of each of the track sections on the track support.

The track of the present invention is not limited to a double track and the track can be one or more tracks comprising one or more depressions or ridges. For example, the track can be a single track comprising a single ridge or depression formed from a pair of lips either side of the track for guiding a single wheel along the track. In which case, the joint connecting adjacent track sections together is not limited to having multiple tapered ends or mitred joints and can comprises a single tapered edge at each end so as to allow the wheels of the load handling device to transition from one track section to an adjacent track section.

Figure 17:
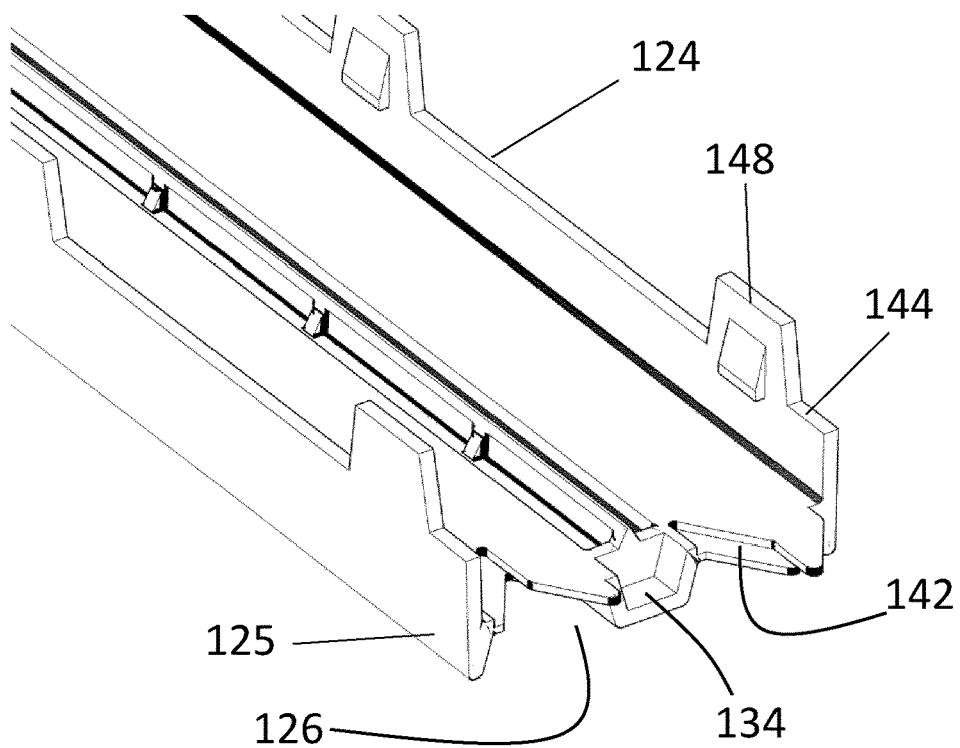
FIG. 17 is a perspective view of the underside of the connecting portion of the track section showing the shaped grooves of the tongue and groove joint at the edge of the connecting portion according to an embodiment of the present invention.

Also shown in FIG. 15, the joint 128 connecting adjacent track sections together may also comprise an overlapping joint in the sense that the joint 128 comprises a tongue 140 that is receivable in a correspondingly shaped groove 142 of an adjacent track section. When assembling the track sections together on the grid structure, the tongue 140 of a first track section is arranged to slide so as to be receivable in a correspondingly shaped groove 142 in a bottom wall 144 of a second adjacent track section to create the overlapping joint (see FIGS. 15 and 17). FIG. 17 shows the underneath of one of the connecting portions or track section elements 124 of the track section showing the groove 142 in the bottom wall 144 that is shaped for receiving the tongue 140 of an adjacent track section. The overlapping joint provides structural stability to the joint to bear the weight of the load handling device travelling across the junction between adjacent track sections. The thickness of the tongue 140 and/or depth of the shaped groove 142 also controls the track surface between adjoining track sections. To allow for thermal expansion between adjacent track sections, the joint 128 between adjacent track sections comprises a gap 146 as shown in FIG. 15*b*. Because the edges between adjoining track sections are tapered or mitred, the gap 146 between adjacent track sections would not impact the track surface because the gradual transition of the track joint would prevent the wheels of the load handling device sinking into the gap 146. The tongue 140 and groove 142 can be incorporated into the tooling when moulding the track section as a single piece mould, i.e. formed integrally with the track section.

The length of the track section elements or branches 124 of a given track section is dependent on whether grid cells are square or rectangular. For a square grid cell, the length X and Y of the track section elements (see FIG. 16) are equal. However, for a rectangular shaped grid cell the length of one track section element X is different to the length of the other track section element Y.

Figure 18:
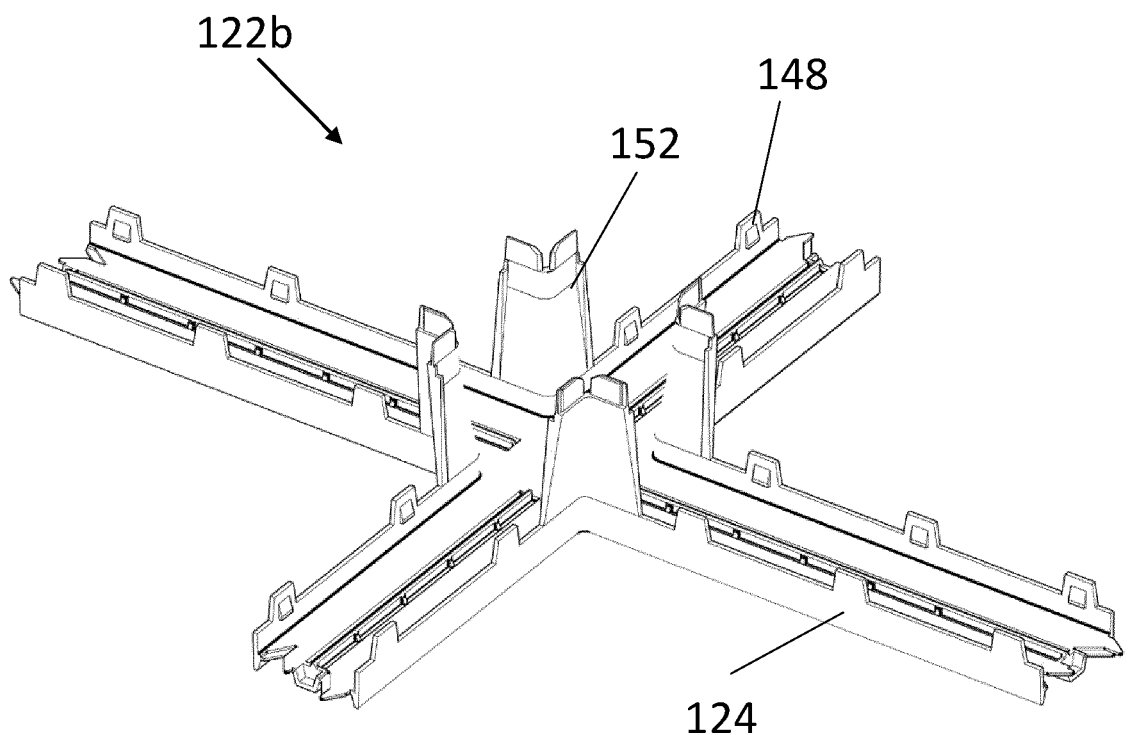
FIG. 18 is a perspective view of the underside of the track section according to the embodiment of the present invention.
Figure 19:
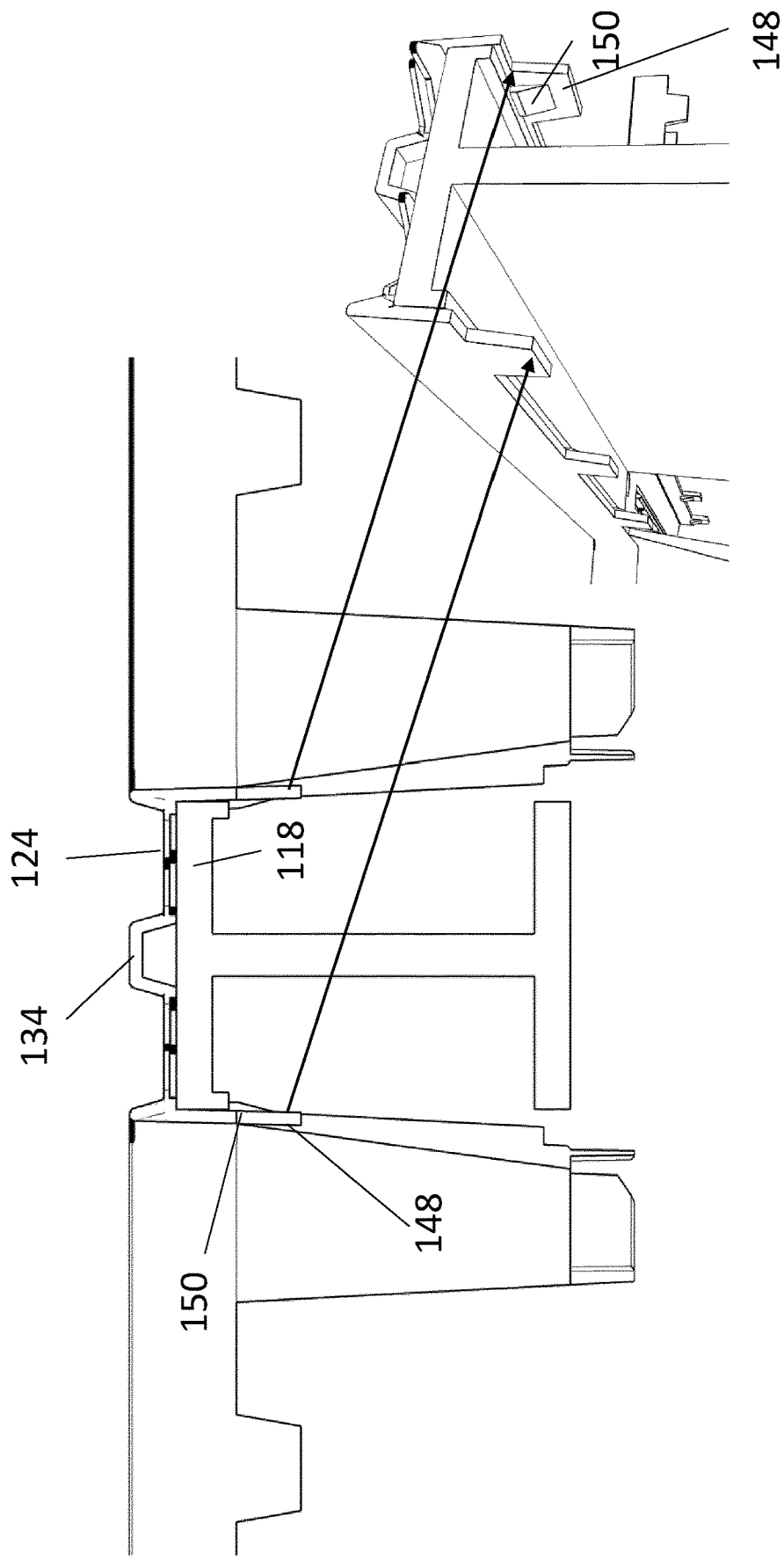
FIG. 19 is a cross sectional view of a track mounted to the track support element according to the embodiment of the present invention.
Figure 21:
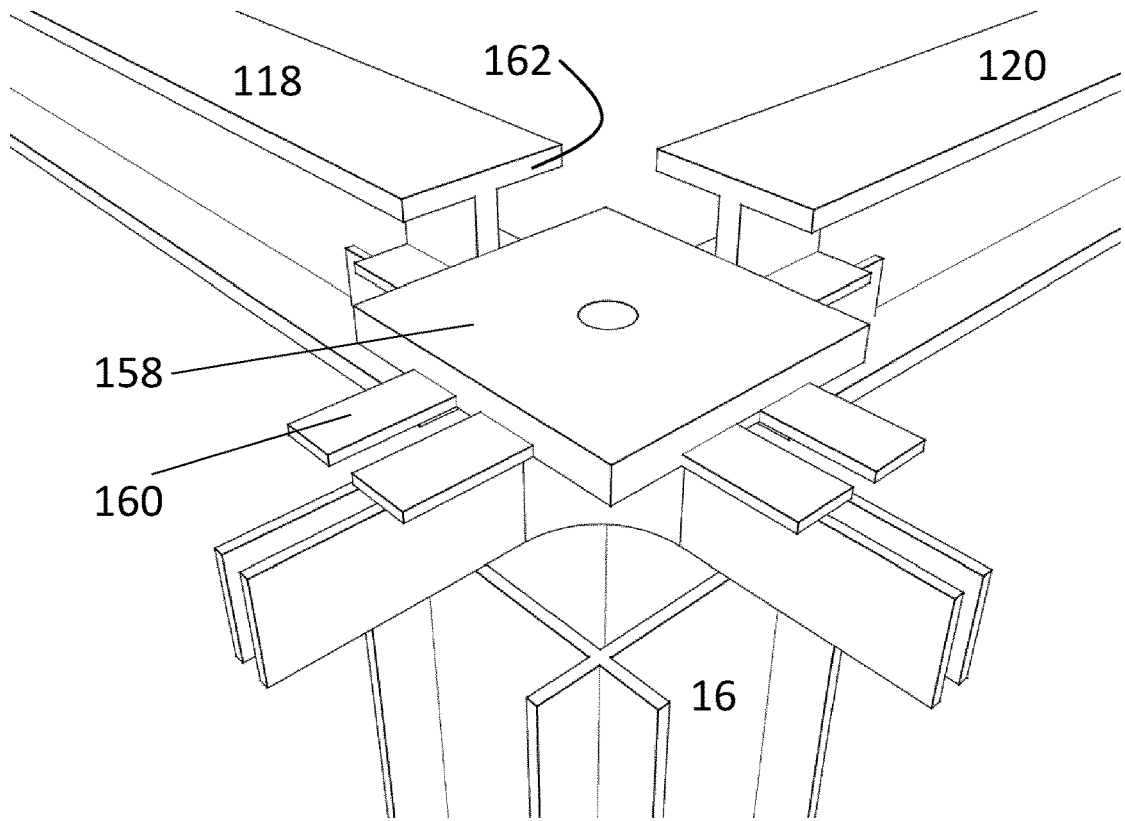
FIG. 21 is a perspective view showing the connections of the track support elements converging at the node of the grid structure according to an embodiment of the present invention.

To secure the track to the grid structure, each of the track sections can be snap fitted to the track supports. In the particular embodiment of the present invention, the underside of the track section shown in FIGS. 17 and 18 comprises one or more lugs 148 that are configured to be snap fitted to the track support 118, 120. As clearly demonstrated in the cross-sectional view of the track section shown in FIG. 19, the one or more lugs can comprises a bead or protruding edge 150 that is arranged to deflect and catch an edge of the track support in a snap fit arrangement. The particular snap fit feature shown in FIGS. 18 and 19 is a cantilever snap fit as is commonly known in the art. However, other forms of snap fit connections commonly known in the art for securing the track section to the track support are applicable in the present invention. Equally, other forms of securing the track section to the track support besides a snap fit joint are applicable in the present invention, e.g. the use of fasteners or an adhesive. The track section in FIG. 21 is shown mounted to an I-beam, in particular snap fitted to a beam flange. However, the track support does not necessarily need to be an I-beam and the track section of the present invention could equally be mounted to back to back C sections discussed above with reference to FIG. 7. Each branch or transverse portion or track section element 124 of the track section comprises a plurality of lugs 148 that are arranged to be snap fitted to an underlying track support.

Also shown in FIG. 18, each of the track sections comprises guide members 152 at the intersection between their respective transverse sections or track section elements 124 of the track section that extend downwardly. The guide members are shaped for guiding a grabber device and/or containers through the grid cells in the area where the intersecting track supports are connected at the nodes of the grid structure as shown in FIG. 12. Without the guide members, the grabber device and/or the containers would snag against the area where the intersecting track supports are connected together as clearly shown in FIG. 20 where the track section is shown removed from the grid structure. Four guide members 152 are shown in FIG. 18 configured to cooperate with the four corner sections between the intersecting track supports so as to correctly locate the track section at the node of the grid structure and provide a guiding surface for the grabber device and/or the containers through a given grid cell. Each of the guides 152 is in the form of a downwardly extending skirt and comprises two perpendicular plates (two guiding plates perpendicular to each other) that extend downwardly in the direction of the upright column, i.e. vertically, and arranged to cooperate with the corner section between the intersecting track supports. Each of the two perpendicular plates of the downwardly extending guides can also extend to cooperate with the corner sections of the vertical uprights supporting the grid structure (see FIG. 20). Once seated on the grid structure, the guide members also help to prevent lateral movement of the track section on the track support and provide a guiding surface for the grabber device and/or the container.

Figure 20:
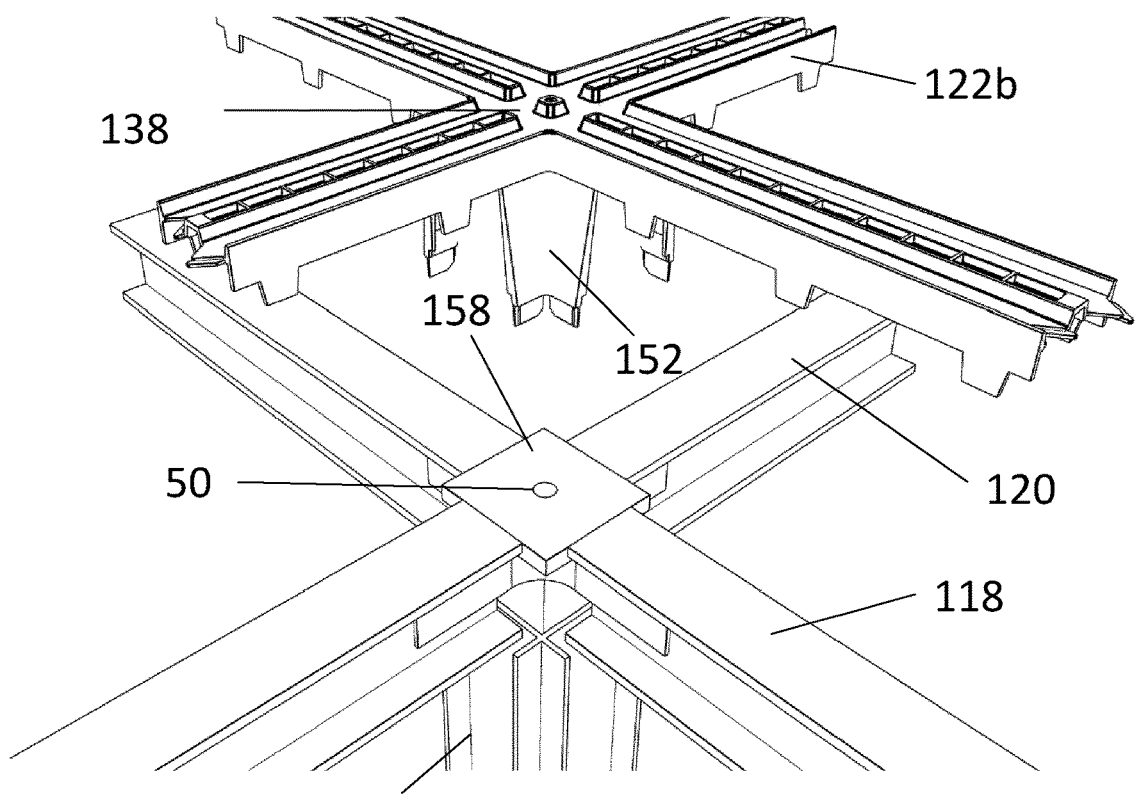
FIG. 20 is a perspective view showing the mounting of the track section according to the embodiment of the present invention to the grid structure at the node.

As discussed above with reference to FIG. 8, a cap plate can be used to join the intersecting track supports or grid members at the nodes to which the track section of the present invention is mounted at the node of the grid structure. In another embodiment of the present invention shown in FIGS. 20 and 21, different arrangements of the connections between the cap plate and the converging track supports at the nodes are shown. In FIGS. 20 and 21, the cap plate 158 provides a continuation of the track support surface at the nodes 50, i.e. the surface of the cap plate is flush with the track support surface. Depending on the location of the cap plate 158 in the grid structure, the cap plate 158 comprises connecting portions 160 that are configured to seat and be fixed to the ends 162 of the track supports at the nodes 50. In the particular embodiment shown in FIG. 20, the cap plate 158, more particularly the connecting portions 160 of the cap plate are fixed to the ends track support 162 that converge at the nodes by one or more bolts. In addition, the track section can optionally be secured to the cap plate 158 by a bolt. In the particular embodiment shown in FIGS. 20 and 21, a cap head screw (not shown) can be inserted into the island 138 at the intersection of the track section portions or transverse sections of the track section (see FIG. 15) and can threadingly engage with the cap plate 158 below.

Figure 22:
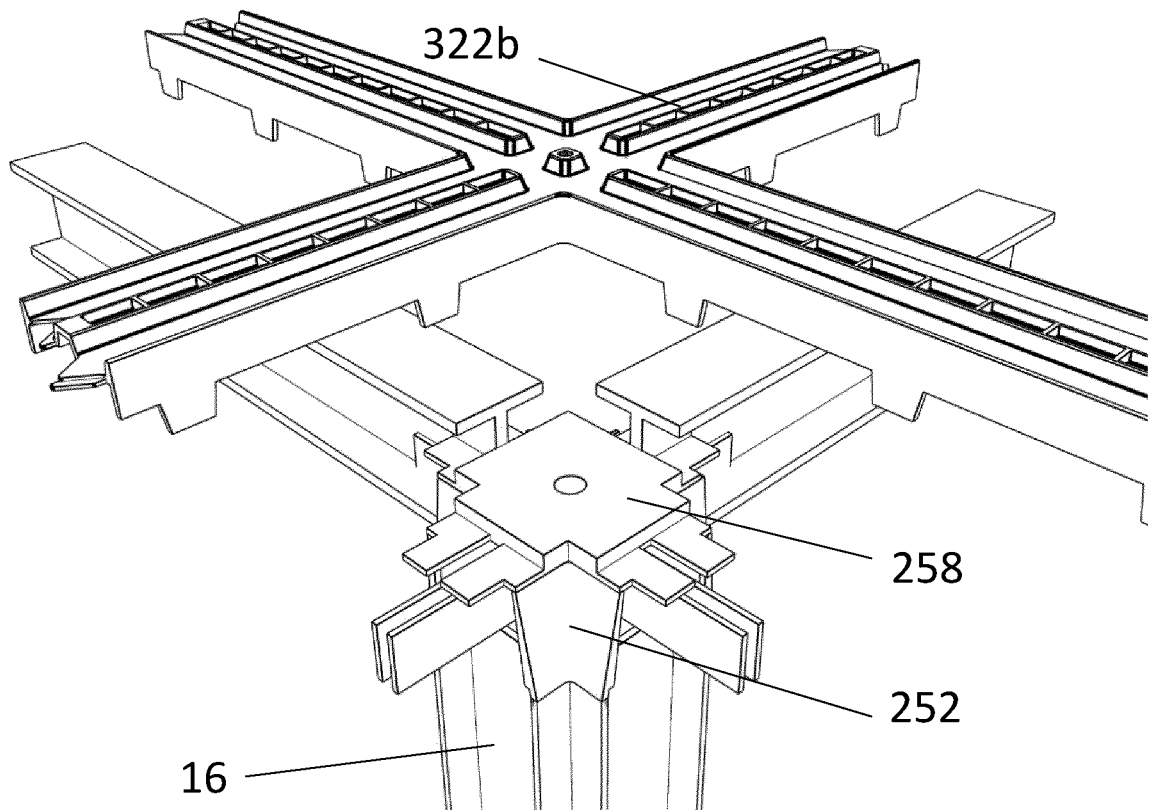
FIG. 22 is a perspective view showing the mounting of the track section according to another embodiment of the present invention to the grid structure at the node.
Figure 23:
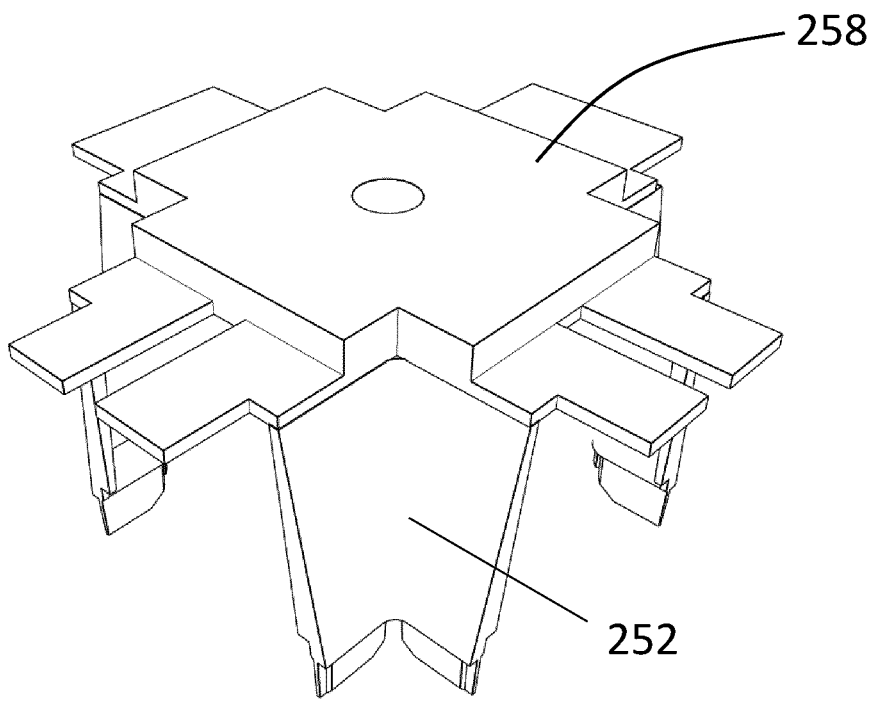
FIG. 23 is a perspective view of a cap plate for joining the track support elements at the node of the grid structure shown in FIG. 22.

Whilst the embodiment shown in FIGS. 18 to 21 shows the guide members integrally formed into the track section, in another embodiment of the present invention the guide members 252 can alternatively be transferred to the cap plate 258 as shown in FIGS. 22 and 23 and the track section 322*b* secured to the cap plate 258. In the particular embodiment shown in FIGS. 22 and 23, the guide members are integrally formed with the cap plate rather than being integrally formed with the track section.

In all of the embodiments of the present invention, the track is mounted to the track support or grid member. As a result of this configuration, the track support can bear a greater proportion of the weight or the full weight of one or more load handling devices operative on the track. Thus, the track can be made from less load bearing materials in comparison to metal used in conventional practice. This has the advantage that different forming methods can be used to mould the track sections than the current extrusion process, which is the preferred forming process where the track is largely fabricated from metal, e.g. aluminium. Extrusion consists of forcing a metallic work piece through a shaped die to reduce its cross section and convert it to the desired shape. However, the dimensional tolerances of extrusion are poor in comparison to other forming processes such as injection moulding and additive manufacturing such as 3D printing. Since the track sections are fabricated to tight dimensional tolerances so as to provide a continuous uninterrupted track surface when the individual track sections are assembled together on the grid structure, the extruded track sections are subsequently followed by a machining process. Moreover, extrusion is not able to produce the various cut outs and islands in the profile of the track without a subsequent machining process.

In the particular embodiment of the present invention, the track comprises a plastic material rather than being formed entirely from metal. Examples of a plastic that can be used to form the track sections of the present invention include but are not limited to various thermoplastic polymers such as polypropylene, nylon etc. As a result, better forming processes can be used that provide better dimensional tolerances in the formed part. One example of a forming process that is able to produce a part with improved dimensional tolerances that is used in the present invention is injection moulding, but other forming processes are applicable in the present invention including but not limited to additive manufacturing, such as 3D printing, and casting. In the particular embodiment of the present invention, the track section is injection moulded. Injection moulding is able to produce parts with various intricate profiles to tight dimensional tolerances, removing the need to carry out any extensive machining process to the finished part. A smaller number of tools would need to be used to mould the track sections of the present invention. These include tooling for the corner, peripheral and central sections of the grid structure. Also the use of plastic material allows the track sections to be easily snap fitted to the track supports without the need to use excessive force, and in some cases the track sections can be snap fitted by hand to the track supports. The ability of plastic material to deflect in comparison to metal allows the fitting of the track section of the present invention to the track support to be automated, without tooling or with limited use of tooling. Thus, an entire fitting of the track to the grid structure can be automated.

Whilst the use of plastic material provides advantages in terms of its mouldability to tight dimensional tolerances, one of the drawbacks of the use of plastic material is its inability to conduct static electricity accumulated on the surface of the track to ground as a result of the engagement of the wheels of the load handling device, in particular the tyres of the wheels. To overcome this drawback, in a particular embodiment of the present invention, the plastic material is made conductive by the incorporation or mixing of a conductive material. For example, conductive fillers can be mixed with the plastic material prior to moulding to render the plastic material conductive. Examples of known conductive fillers include but are not limited to carbon (e.g. graphite) and metallic fillers, e.g. copper, silver, iron etc. The conductive fillers can be in particulate form or fibres. For example, conductive fillers in the range of 20% to 50% by weight can be added to the plastic material to render the plastic material conductive. Alternatively, conductors can be insert moulded within the plastic material to provide a continuous conductive path in the track. However, in the case where each of the track sections making up the track is composed of metal, then other forming processes known in the art that provide the necessary dimensional tolerance are applicable in the present invention, such as casting, e.g. pressure die casting.

Double or Dual Track

Figure 24:
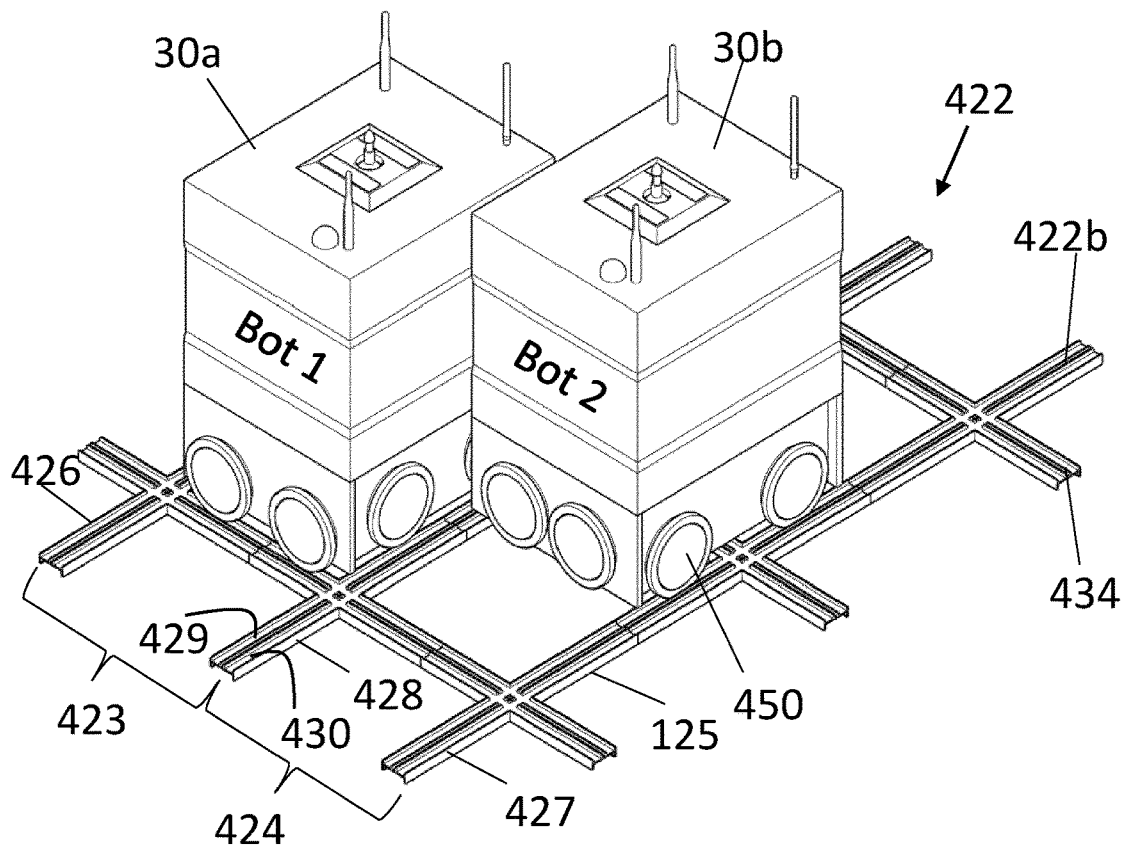
FIG. 24 is an illustration of adjacent load handling devices sharing dual or double tracks of the grid structure according to a known grid structure.

In the track assembly 422 shown in FIG. 24, a dual or double track allows two adjacent load handling devices to pass each other on the same track. For the purpose of the present invention, the term "track" or "track assembly" can be construed to also encompass a first set of parallel tracks 423 extending in a first direction and a second set of parallel tracks 424 extending in the second direction, the second direction being transverse to the first direction. As discussed above, the track or track assembly are broken up into a plurality of interconnected track sections. Here, the track sections 422*b* are arranged in a grid pattern such that parallel tracks 423, 424 share a common track 428. Thus, a sets of wheels 450 from adjacent load handling devices 30*a*, 30*b* share the common track 428. To allow two load handling devices 30*a*, 30*b*, to pass each other on the same track, typically the dual track comprises two paths separated by a central ridge or rib 434 as clearly shown in FIG. 24. The dual or double track can also be seen in the track section shown in FIG. 16. Together with lips 125 either side of the central ridge 434, two pairs of guide surfaces are created that extend from the track surface of the track. As a result, each set of wheels 450 of adjacent load handling devices is guided by a pair of lips 125, 434 either side of the track. In other words, each lip of the pair of lips of the track defines a guide surface extending from the track surface for guiding both sides or faces (inner and outer faces of the wheels) of the wheel, i.e. two pairs of guide surfaces on each track, with a pair for each wheel.

FIG. 24 shows two load handling device (a first load handling device 30*a* and a second load handling device 30*b*) side by side travelling on the double or dual track. As can be seen in FIG. 24, each of the first and second load handling devices comprises a wheel assembly. In the particular embodiment shown in FIG. 24 and discussed in the introductory part of the specification, the wheel assembly of each of the first and second load handling devices comprises a first and second set of wheels. The first set of wheels comprises a pair of wheels on the front and back of the vehicle body, and the second set of wheels comprises a pair of wheels on each side of the vehicle body. The first set of wheels of each of the first and second load handling devices is arranged to be engageable with the parallel sets of tracks 423, 424. In the particular embodiment shown in FIG. 24, the second set of wheels to each side of the vehicle body are arranged to be engageable with parallel tracks transverse to the aforementioned sets of parallel tracks 423, 424 depending on the direction of travel of the load handling devices on the track. For example, to move in a first direction on the tracks, the first set of wheels engages with a parallel set of tracks extending in a first direction, and to move in a second direction that is transverse to the first direction, the second set of wheels engages with a set of parallel tracks extending in a second direction. For ease of explanation of the forthcoming present invention, the track assembly comprises a first set of parallel tracks 423 and a second set of parallel tracks 424, the first and second set of parallel tracks sharing a common track 428. Equally, the first set of parallel tracks 423 comprises a first track 426 to one side of the common track 428, and the second set of parallel tracks 424 comprises a second track 427 to the other side of the common track 428. As the tracks are arranged in a grid pattern, the first and second sets of parallel tracks extending in the first direction define a first track assembly. On the other hand, the first and second sets of parallel tracks extending in the second direction, the second direction being transverse to the first direction, define a second track assembly. Thus, the first set of wheels of adjacent load handling devices are engageable with the first 423 and second 424 set of parallel tracks forming the first track assembly extending in the first direction. Similarly, the second set of wheels of adjacent load handling devices are engageable with a transverse first and second set of parallel tracks forming the second track assembly extending in the second direction. In each of the first and second track assembly, the first and second sets of parallel tracks share a common track. FIG. 24 shows an example where the first set of wheels of adjacent load handling devices engages with the first 423 and second 424 sets of parallel tracks of the first track assembly.

The function of the dual or double track is clearly apparent in FIG. 24 showing the set of wheels 450 from adjacent load handling devices sharing the common track 428 such that they are able to pass each other on the same track. The guide surfaces extending from the track surface are such that a first 423 and second 424 sets of parallel tracks (in either the first or second track assembly) are provided by three parallel tracks 426, 427, 428 where the first 423 and second 424 sets of parallel tracks share a common track 428.

Figure 25:
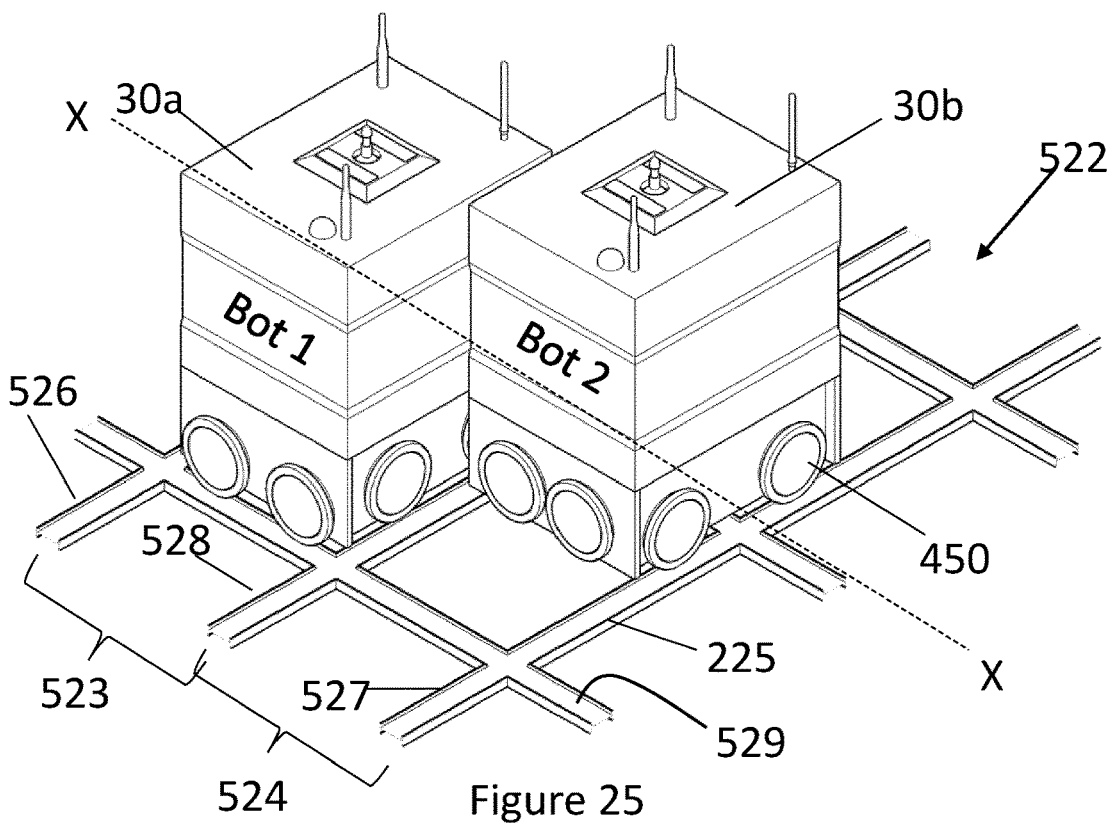
FIG. 25 is an illustration of adjacent load handling devices sharing dual or double tracks of the grid structure according to an embodiment of the present invention.

For illustration purposes, the load handling device 30*a* to the left of FIGS. 24 and 25 is labelled Bot 1, and the load handling device 30*b* to the right is labelled Bot 2. The dual or double track is such that each track comprises two pairs of guide surfaces extending from the track surface such that each wheel is guided on both sides or faces of the wheel. The dual or double track is configured so that Bot 1 is able to travel on the track along a first path 429 and Bot 2 is able to travel along the track along a second path 430. In respect of the common track shared between Bot 1 and Bot 2, the first path is adjacent to the second path. The pairs of guiding surfaces or lips are such that Bot 1 never traverses into the second path 430 and Bot 2 never traverses into the first path 429. In other words, Bot 1 and Bot 2 never cross paths when traversing along the common track 428. The first and second paths 429, 430 are separated by the central ridge or lip 434. Also shown in FIG. 24 is that the track is made up of separate track sections assembled together. The separate track sections can be based on the track sections described with reference to FIG. 16 comprising transverse sections, or alternatively the track sections described with reference to FIG. 10 showing a single elongated element.

In FIG. 24, the load handling devices are constrained to remain in their respective tracks by constraining both sides or both faces of the wheels of the load handling devices. However, the problem with constraining both sides of the wheels is that the width between a pair of lips should be sufficient to prevent over constraining the wheels as the wheels need to freely travel between the pair of lips or guide surfaces 125. Having four guide surfaces provided by two pairs of lips would have a tendency to over constrain the wheels of the load handling devices. Moreover, the cross-sectional profile of the dual track comprising lips or guide surfaces either side of the track and a central lip or ridge over complicates the manufacturability of the tracks, in particular the track sections, to accommodate the cross-sectional profile of a dual track. For example, additional machining operations may need to be necessary to ensure the reproducibility of the width between the pair of lips of multiple track sections. In the case of an extrusion process, this machining process becomes more necessary. In addition, the central ridge or lip 434 raises the vulnerability of one or more adjacent load handling devices derailing. This is particularly, the case where there is a discrepancy between adjacent track sections, or the dimensional tolerances of the track sections vary from one track section to another track section, causing a slight change in the width between adjacent track sections or a slight shift in the widths between the pairs of guide surfaces or lips as result of the installation of the track sections.

In the present invention, only one guide surface extending from the track surface is necessary to guide a load handling device along a given path on the track, i.e. the guide surface will only need to constrain one side or face of the wheels rather than both sides or faces of the wheels. Thus, for a dual or double track, each track or track section can comprise only two guide surfaces extending from the track surface, one for each adjacent load handling device, so as to guide adjacent load handling devices along their respective paths on the dual track or track section. Using the terminology above, the two guide surfaces guide adjacent load handling devices along a first path and a second path of the common track. As the guide surfaces extend from the track surface of parallel tracks 523, 524, a single guide surface will only be needed on each track to prevent lateral movement of a given load handling device along its respective path along the track. Thus, for a dual or double track only two guide surfaces are needed. Using the terminology above, the guide surface extending from the first track 526 at one side of the common track 528 prevents lateral movement of a first load handling device (Bot 1) 30*a*, and the guide surface extending from the second track 527 on the other side of the common track 528 prevents lateral movement of a second load handling device (Bot 2) 30*b*. In other words, the guide surfaces 225 of the track 526, 527 laterally disposed either side of the common track 528 prevent adjacent load handling devices 30*a*, 30*b* sharing the common track 528 from crossing into each other's paths, i.e. the first load handling device 30*a* into the second path of the common track 528 occupied by the second load handling device, and the second load handling device 30*b* into the first path occupied by the first load handling device 30*a*. There are different ways to provide a track comprising only two guide surfaces extending from the track surface, and these will be described in detail below.

In an aspect of the present invention shown FIG. 25, the central ridge or lip has been removed so that each track 526, 527, 528 comprises only two guide surfaces 225 extending from the track surface 529 rather than four guide surfaces as in the example shown in FIG. 24. In the particular embodiment shown in FIG. 25, the track surface 529 not only extends continuously along the track but also between the guide surfaces 225 provided by the lips either side of the track 526, 527, 528. Thus, each track or track section comprises only two guide surfaces. The arrangement of adjacent load handling devices on the tracks of the present invention is clearly shown in the cross-section along the line X-X in FIG. 26. Using the terminology discussed above, the first load handling device 30*a* (Bot 1) is guided on the first set of parallel tracks 523 by a single guide surface on each track. Similarly, the second load handling device 30*b* (Bot 2) adjacent the first load handling device 30*a* (Bot 1) is guided on the second set of parallel tracks 524 by a single guide surface on each track. The first and second set of parallel tracks 523, 524 share a common track 528 such that the wheels 450 of Bot 1 and Bot 2 are shared on the common track 528. Using the terminology above, either the first or the second sets of wheels of Bot 1 and Bot 2 engage with parallel sets of tracks depending on the direction of Bot 1 and Bot 2 on the tracks. For example in FIGS. 25 and 26, the first set of wheels of Bot 1 and Bot 2 engage with the first 523 and second 524 sets of parallel tracks respectively, such that a pair of wheels 450 of each of the first sets of wheels from both Bot 1 and Bot 2 share the common track 528, i.e. the first sets of wheels engage with the first track assembly. In the transverse direction, the second sets of wheels of Bot 1 and Bot 2 engage with the first and second sets of parallel tracks of the second track assembly that is transverse of the first track assembly.

As two load handling devices share the same tracks, each track 526, 527, 528 comprises only two guide surfaces 525 provided by a pair of lips extending from the track surface 529. Bot 1 and Bot 2 are operative to travel along their respective paths on the track. Using terminology above with respect to FIG. 24, Bot 1 travels along a first path 530 along the common track 528 and Bot 2 travels along a second path 532 along the common track 528. As can be seen in the cross section shown in FIG. 26, the wheels 450 of adjacent load handling devices (Bot 1 and Bot 2) are only constrained on one side or face of the wheels 450. The guide surfaces of the outer tracks 526, 527 either side of the common track 528, termed the first track 526 and second track 527, prevent lateral movement of Bot 1 and Bot 2 across their respective paths so that they do not collide. Putting it another way, the outer tracks constrain the wheels of Bot 1 and Bot 2 from crossing paths on the common track 528.

Figure 26:
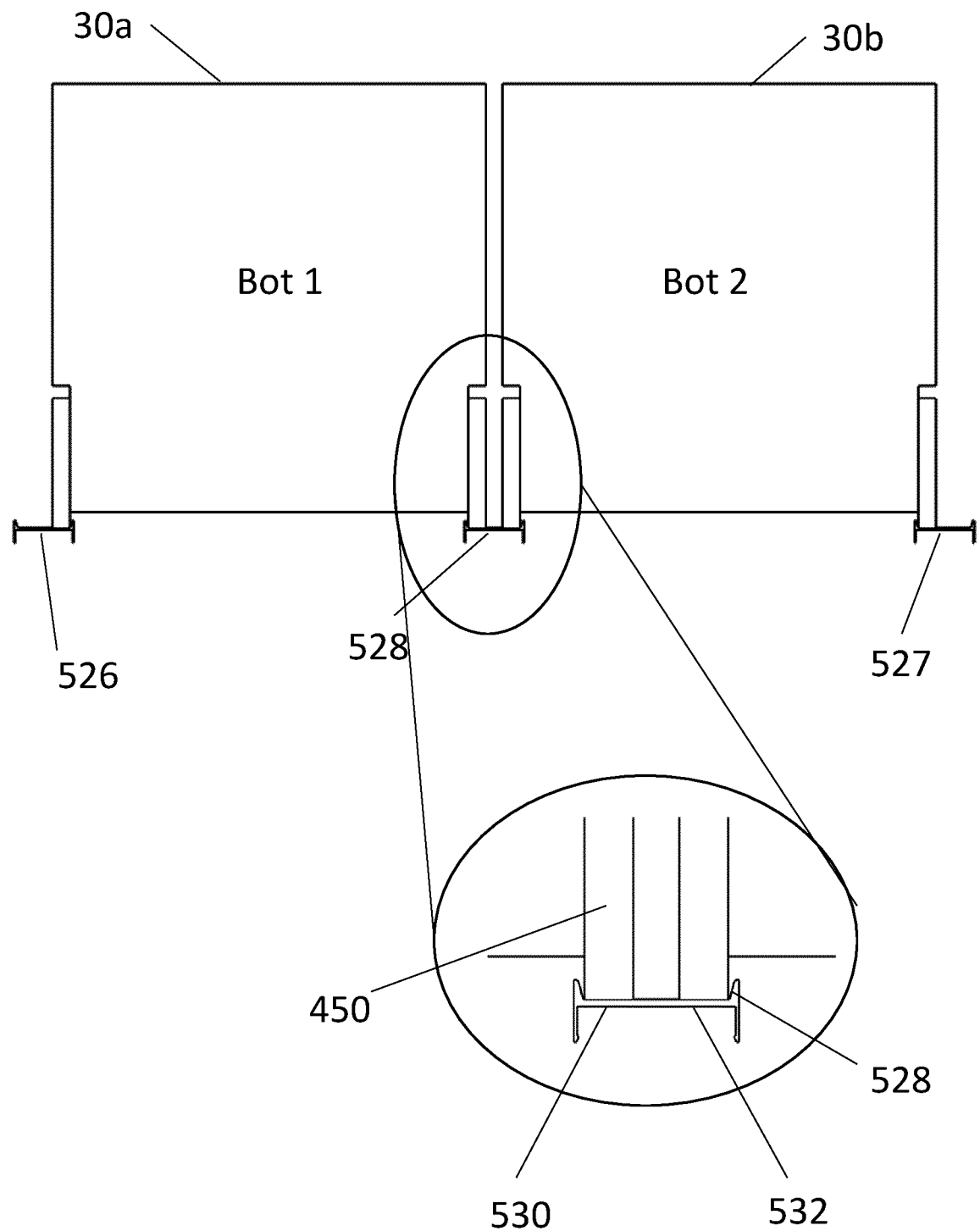
FIG. 26 is a cross sectional view of the adjacent load handling devices shown in FIG. 25 according to the embodiment of the present invention.

As can be seen by the cross-sectional profile of the track shown in FIG. 26, the profile of the track has been simplified by removing the central ridge or lip. Thus, the manufacturability of the track has been simplified without affecting the function of the track to prevent lateral movement of load handing devices as they travel along the track. Secondly, and more importantly, the prospect of the load handling device derailing has been greatly reduced since the wheels of the load handling device are not constrained on both sides or faces of the wheel as in the art.

Figure 27:
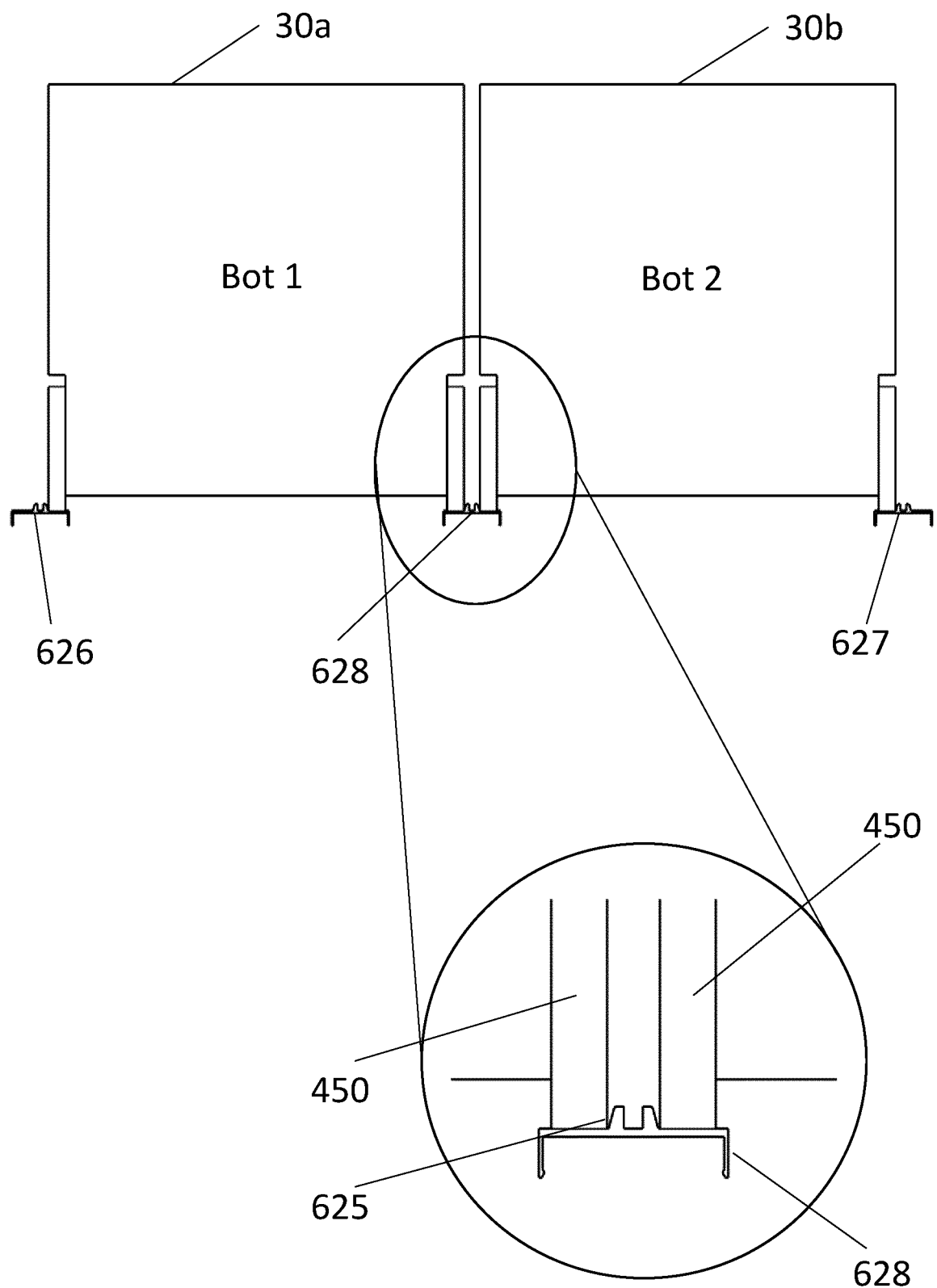
FIG. 27 is an illustration showing a cross sectional view of adjacent load handling devices on the parallel tracks according to another embodiment of the present invention.

Having only two guide surfaces on each track 626, 627, 628 can also be provided by only two guide surfaces extending centrally from the track surface as shown in the cross section of the track shown in another embodiment of the present invention in FIG. 27. Here, two lips 625 are shown spaced apart extending from the centre of the track surface, each of the two lips providing a single guide surface. In all cases, the guide surfaces provided by the central lips constrain or provide a guide surface to only one side or face of the wheels of the load handling devices. Thus, the load handling devices are guided or constrained to travel along their respective paths, i.e. along a first and second path of the common track 628. The central guide surfaces 625, thus, prevent lateral movement of the first and second load handling devices away from their respective paths. The respective first and second paths of adjacent load handling devices along the common track 628 are shown in FIG. 27. By having the lips 625 extend centrally from and along the track surface, the outer surfaces of the lips provide the guide surface to guide the load handling devices along the track. The outer surface of the lips is by definition the surface of the lips exposed or facing towards the edge or outer edge of the track. This is clearly apparent in FIG. 27 showing the outer surfaces of the lips constraining only one side or face of the wheels 450 of the load handling devices. Again, the wheels of the load handling devices travelling on the track are constrained in their respective paths without the need to constrain both sides or faces of the wheels as in the example shown in FIG. 24.

Figure 28:
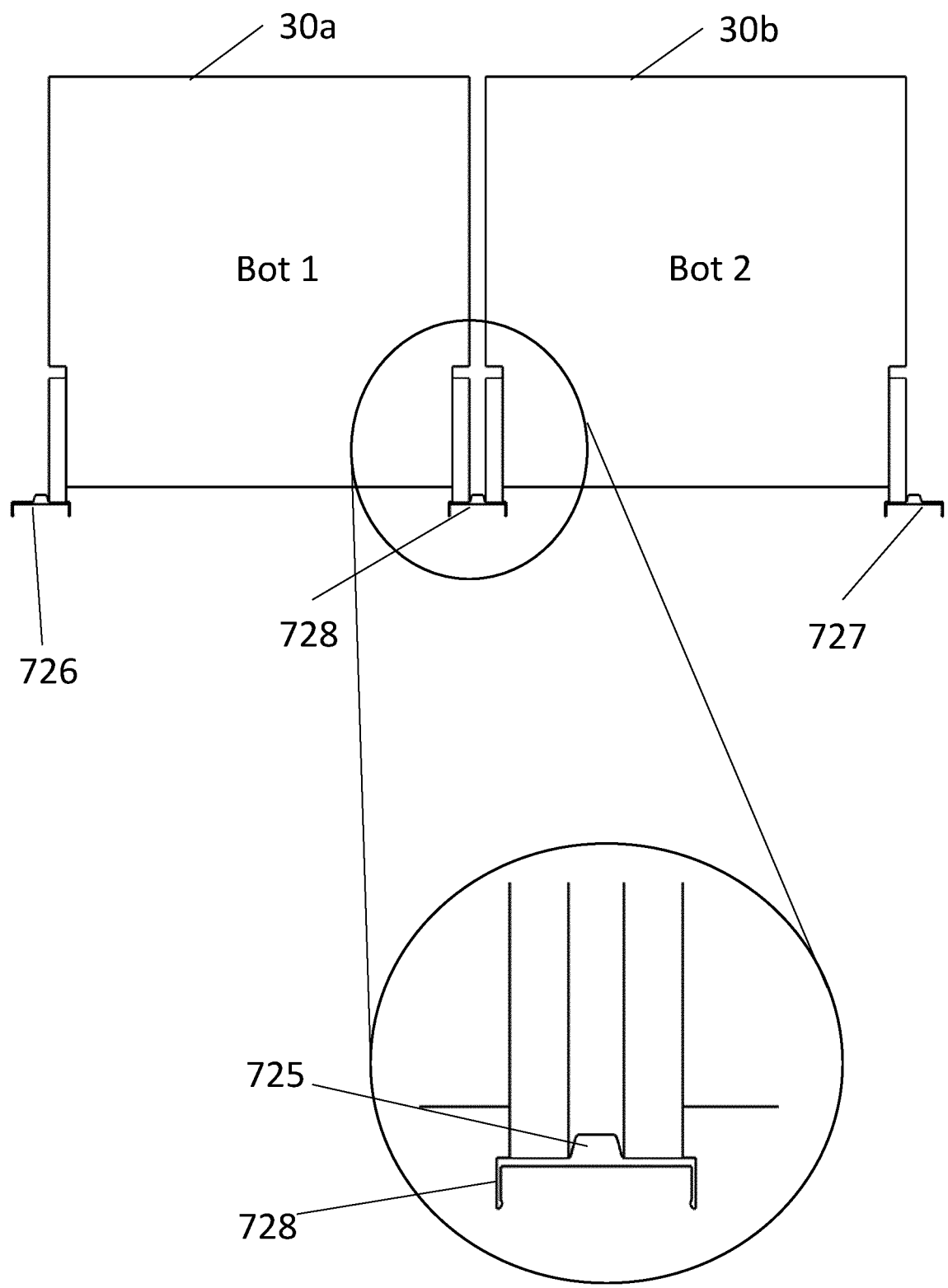
FIG. 28 is an illustration showing a cross sectional view of adjacent load handling devices on the parallel tracks according to another embodiment of the present invention.

Only two guide surfaces can also be provided by a single lip or ridge extending centrally from the track surface of the track 726, 727, 728 as shown in FIG. 28 rather than two separate lips 625 shown in FIG. 27. Here, the outer surfaces of the single lip 725 extending centrally from the track surface provide the only two guide surfaces for guiding adjacent load handling devices along the track and prevent lateral movement of the load handling devices away from their respective paths.

In all of the different embodiments of the present invention discussed above with reference to FIGS. 25 to 28, the wheels of the load handling devices are constrained on only one side or face of the wheels rather than both sides or faces of the wheels as in the art. Thus, the dual or double tracks of the present invention are not limited to the width of pairs of lips or guide surfaces as in prior art tracks, and therefore are more forgiving to slight changes in dimensional tolerances of the guide surfaces or the width of the wheel.

As with the other embodiments described above, the track described with reference to FIGS. 24 to 28 can comprise a plurality of interconnected track sections that are assembled together to make up the track. Moreover, the individual track sections can comprise metal or plastic material as discussed above. Equally, the track sections can be extruded or injection moulded or any other forming process known in the art, e.g. casting.

For the purpose of the present invention, the term "wheels" is construed to broadly cover wheels with or without tyres. In the instance where the guide surface is described as constraining one side or face of the wheels, this is also intended to cover constraining or guiding one side or face of the tyres of the wheels.

It will be appreciated that many different variations and modifications are possible in all of the different embodiments described above. For example, the connecting ends of adjacent track sections that are juxtaposed or abutting described with reference to FIGS. 25 to 28 can be tapered or mitred to enable a gradual transition of the joint between adjacent track sections, and therefore mitigate bumping of the wheels of the load handling devices traversing on the track.

The invention claimed is:

1. A system for guiding the movement of one or more load handling devices in operation, the system comprising:
   a) a first set of parallel tracks and a second set of parallel tracks, the first and second sets of parallel tracks sharing a common track, each track of the first and second sets of parallel tracks providing a track surface; and
   b) a first load handling device and a second load handling device, each of the first and second load handling devices comprises a vehicle body, and including a wheel assembly said wheel assembly having a first set of wheels at the front and back of the vehicle body and a second set of wheels at the sides of the vehicle body such that at least one wheel either side of the vehicle body, the first and second sets of wheels being movable vertically for respectively engaging with the track surface of the first and second sets of parallel tracks such that the wheel assembly of the first and of the second load handling devices is configured for engaging with the track surface of the common track;
   wherein each track of the first and of the second sets of parallel tracks include only two guide surfaces extending from the track surface for guiding the first and second load handing devices along their respective first and second sets of parallel tracks,
   the only two guide surfaces of each of the first and second set of parallel tracks being configured to guide the first load handling device along a first path of the common track and the second load handling device along a second path of the common track, said only two guide surfaces are provided by a single lip either side of the track surface, such that the track surface extends continuously between the single lip either side of the track;
   the first set of parallel tracks includes a first track disposed laterally on one side of the common track and the second set of parallel tracks includes a second track disposed laterally on the other side of the common track such that the first load handling device is constrained to move along the first path of the common track and the second load handling device is constrained to move along the second path of the common track.

2. The system of claim 1, wherein the only two guide surfaces are provided by only one or only two lips.

3. The system of claim 1, wherein the single lip comprises:
   an inner surface facing inwardly of the track surface and an outer surface facing outwardly of the track surface such that the wheel assembly of each of the first and second load handling devices are guided in operation along their first and second sets of parallel tracks by an inner surface of the single lip of a respective track.

4. The system of claim 1, wherein the only two guide surfaces are provided by:
   two lips extending centrally of each track of the first and second sets of tracks, each lip of the only two lips providing a single guiding surface facing outwardly towards an edge of the track such that the wheel assembly of each of the first and second load handling devices are guided by an outer surface of a respective lip of the only two lips.

5. The system of claim 1, wherein the only two guide surfaces are provided by:
   a single lip extending centrally of each track of the first and second sets of tracks, the single lip providing a single guiding surface either side of the single lip such that the wheel assembly of each of the first and second load handling devices is guided by a respective single guide surface of the single lip.

6. The system of claim 1, wherein the first and second sets of parallel tracks define a first track assembly extending in a first direction, and wherein the system comprises:
   a second track assembly including a first and a second set of parallel tracks extending in a second direction, the first direction being transverse to the second direction such that the first and second track assembly are arranged in a grid pattern containing a plurality of grid cells.

7. The system of claim 1, wherein the first and second set of parallel tracks are supported by a plurality of vertical uprights configured and arranged to form a plurality of vertical storage locations for one or more containers to be stacked between the vertical uprights and be guided by the vertical uprights in a vertical direction.

8. The system of claim 7, wherein the plurality of vertical uprights are interconnected at their top ends by the first set of parallel tracks and the second set of parallel tracks.

9. The system of claim 1, wherein each track of the first and second sets of parallel tracks comprises:

a plurality of interconnected track sections.

10. The system of claim 1, wherein each of the first and second load handling devices comprises:
   a) a container-receiving space located above the track; and
   b) a lifting device configured and arranged to lift a single container from a stack into the container-receiving space.

11. The system of claim 7, wherein the system is a storage system comprising:
   one or more containers stacked between the plurality of vertical uprights.

* * * * *